US010209897B2

(12) United States Patent
Tanaka

(10) Patent No.: US 10,209,897 B2
(45) Date of Patent: Feb. 19, 2019

(54) STORAGE DEVICE AND CONTROL METHOD OF THE SAME

(71) Applicant: Toshiba Memory Corporation, Minato-Ku, Tokyo (JP)

(72) Inventor: Atsushi Tanaka, Fujisawa Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 73 days.

(21) Appl. No.: 15/443,850

(22) Filed: Feb. 27, 2017

(65) Prior Publication Data

US 2018/0157414 A1    Jun. 7, 2018

Related U.S. Application Data

(60) Provisional application No. 62/428,574, filed on Dec. 1, 2016.

(51) Int. Cl.
*G06F 3/06* (2006.01)
*G06F 12/02* (2006.01)

(52) U.S. Cl.
CPC ............ *G06F 3/061* (2013.01); *G06F 3/0655* (2013.01); *G06F 3/0679* (2013.01); *G06F 12/0246* (2013.01); *G06F 2212/7201* (2013.01)

(58) Field of Classification Search
CPC ......... G06F 12/0246; G06F 2212/7201; G06F 3/061; G06F 3/0655; G06F 3/0679
See application file for complete search history.

(56) References Cited

U.S. PATENT DOCUMENTS

| 8,166,258 | B2 | 4/2012 | Lund et al. |
| 9,047,959 | B1* | 6/2015 | Myouga ................. G11C 16/10 |
| 2007/0079061 | A1* | 4/2007 | Ogasawara ............... G06F 9/52 |
| | | | 711/112 |
| 2010/0063983 | A1* | 3/2010 | Groarke .................. H04L 47/15 |
| | | | 707/803 |
| 2011/0022779 | A1* | 1/2011 | Lund ................... G06F 12/0246 |
| | | | 711/103 |
| 2013/0246689 | A1* | 9/2013 | Matsudaira ......... G06F 12/0246 |
| | | | 711/103 |
| 2015/0046747 | A1 | 2/2015 | Gaertner et al. |
| 2015/0074358 | A1 | 3/2015 | Flinsbaugh et al. |

* cited by examiner

*Primary Examiner* — Yaima Rigol
(74) *Attorney, Agent, or Firm* — White & Case LLP

(57) ABSTRACT

According to one embodiment, a storage device includes a nonvolatile memory and a controller. The controller includes a host interface control circuit and a memory interface control circuit. When, within a period during which the controller is in a mode to manage mapping between logical addresses and physical addresses of the nonvolatile memory in units of management size corresponding to plural clusters, a skip write command with a skip mask indicating logical blocks to be transferred is received from a host, the host interface control circuit transfers write data to a buffer in units of clusters, and transmit plural write instructions to the memory interface control circuit when the cluster being currently transferred is the last valid cluster in the plural clusters.

3 Claims, 19 Drawing Sheets

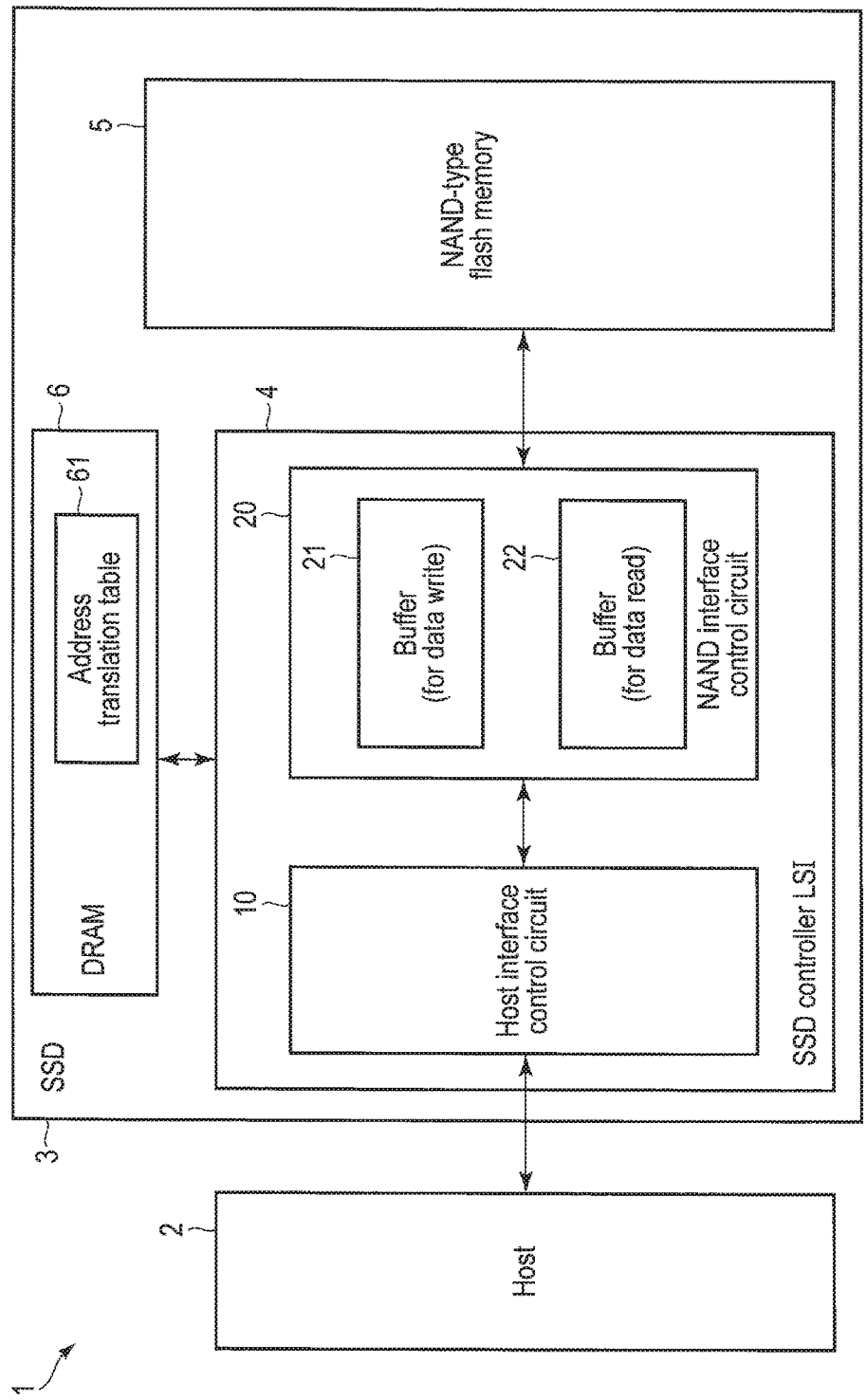
F I G. 1

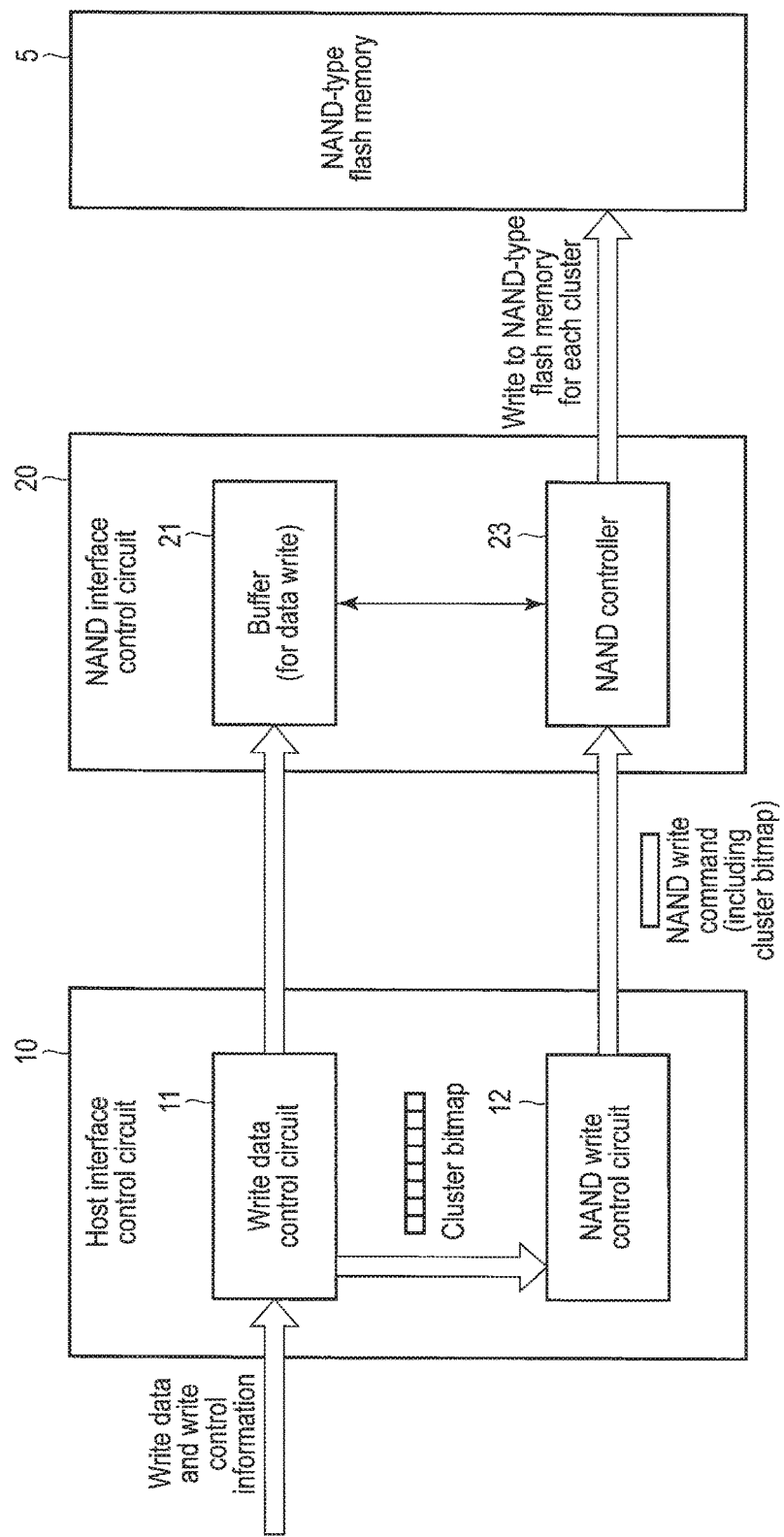
F I G. 2

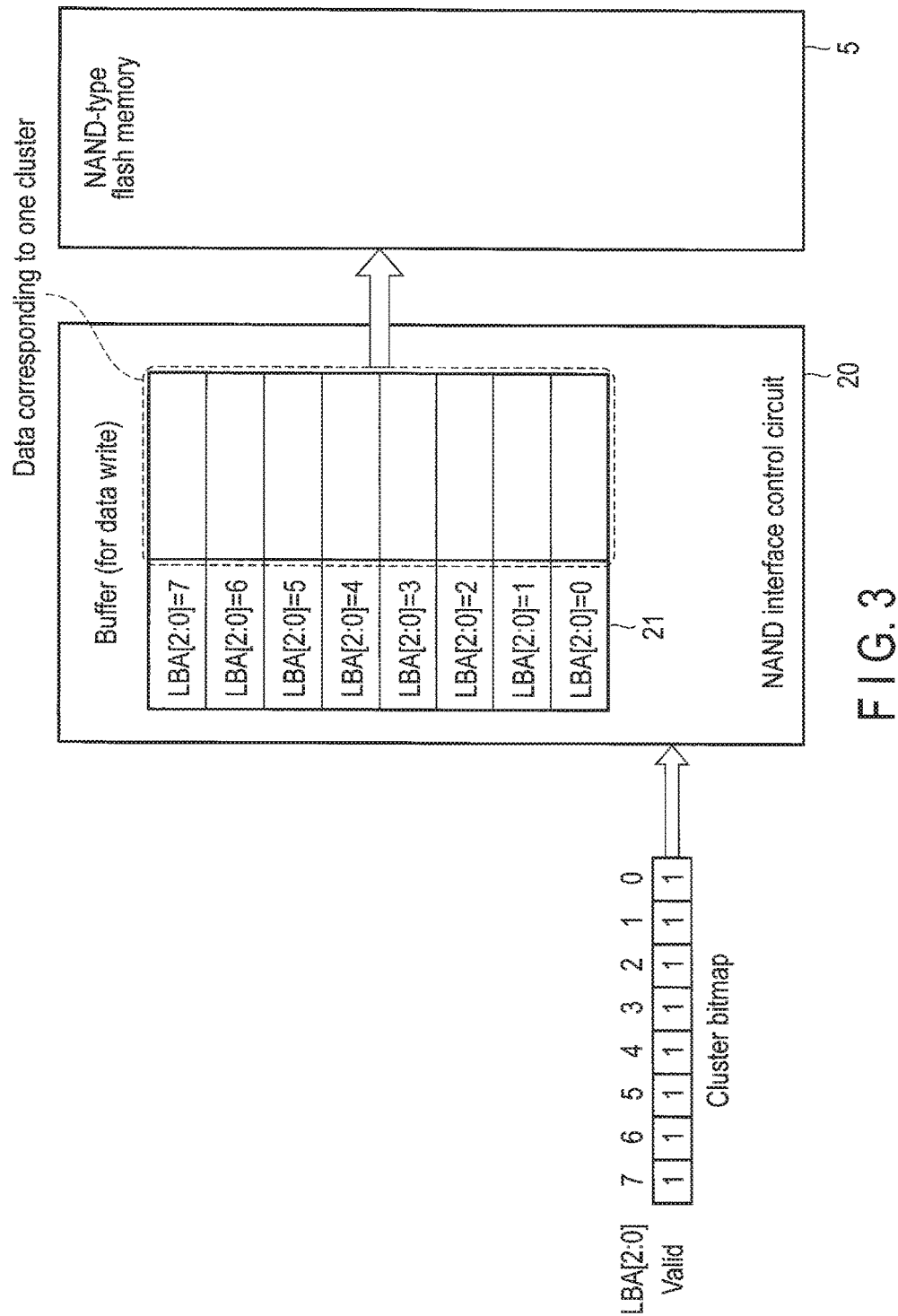
F I G. 3

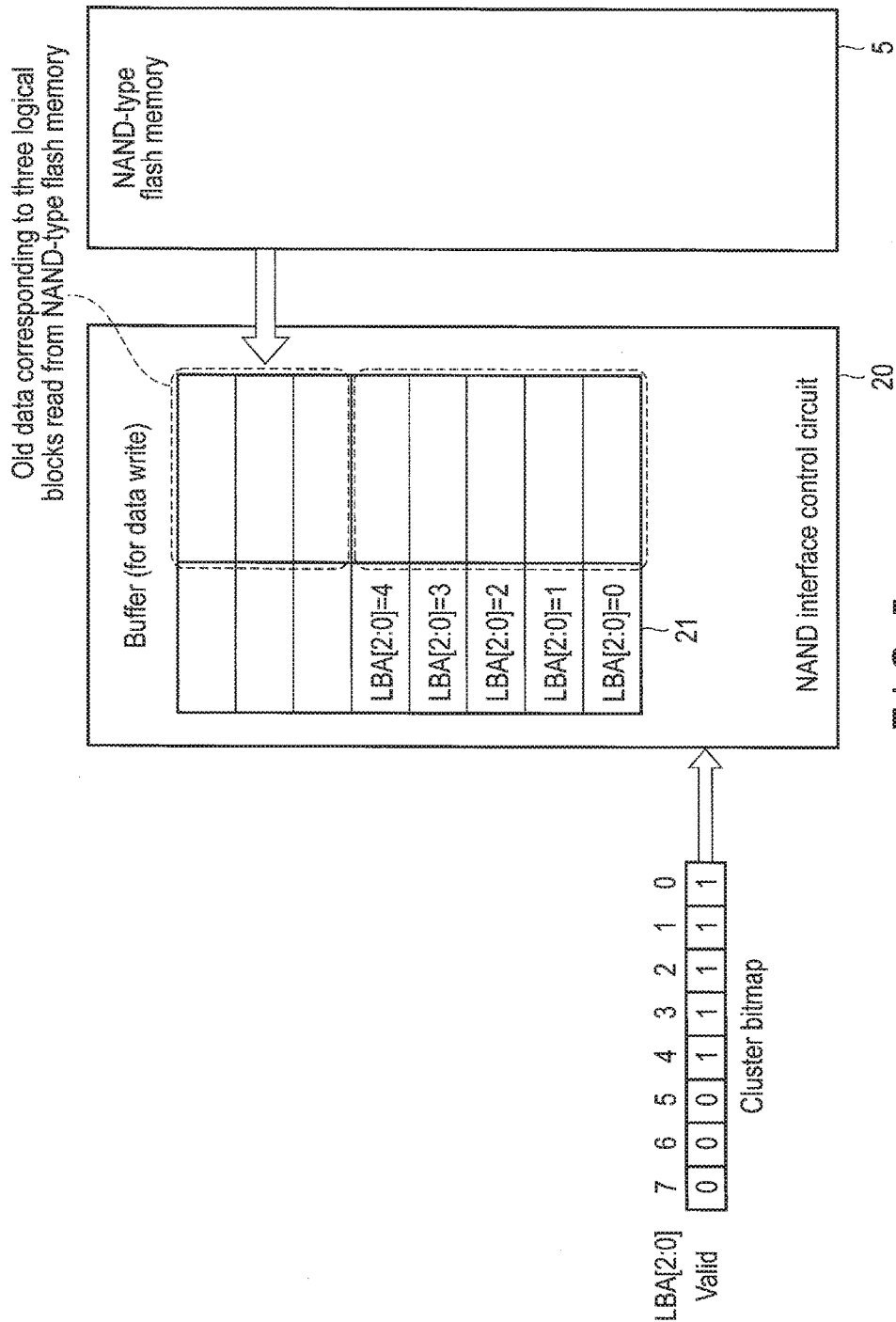
F I G. 5

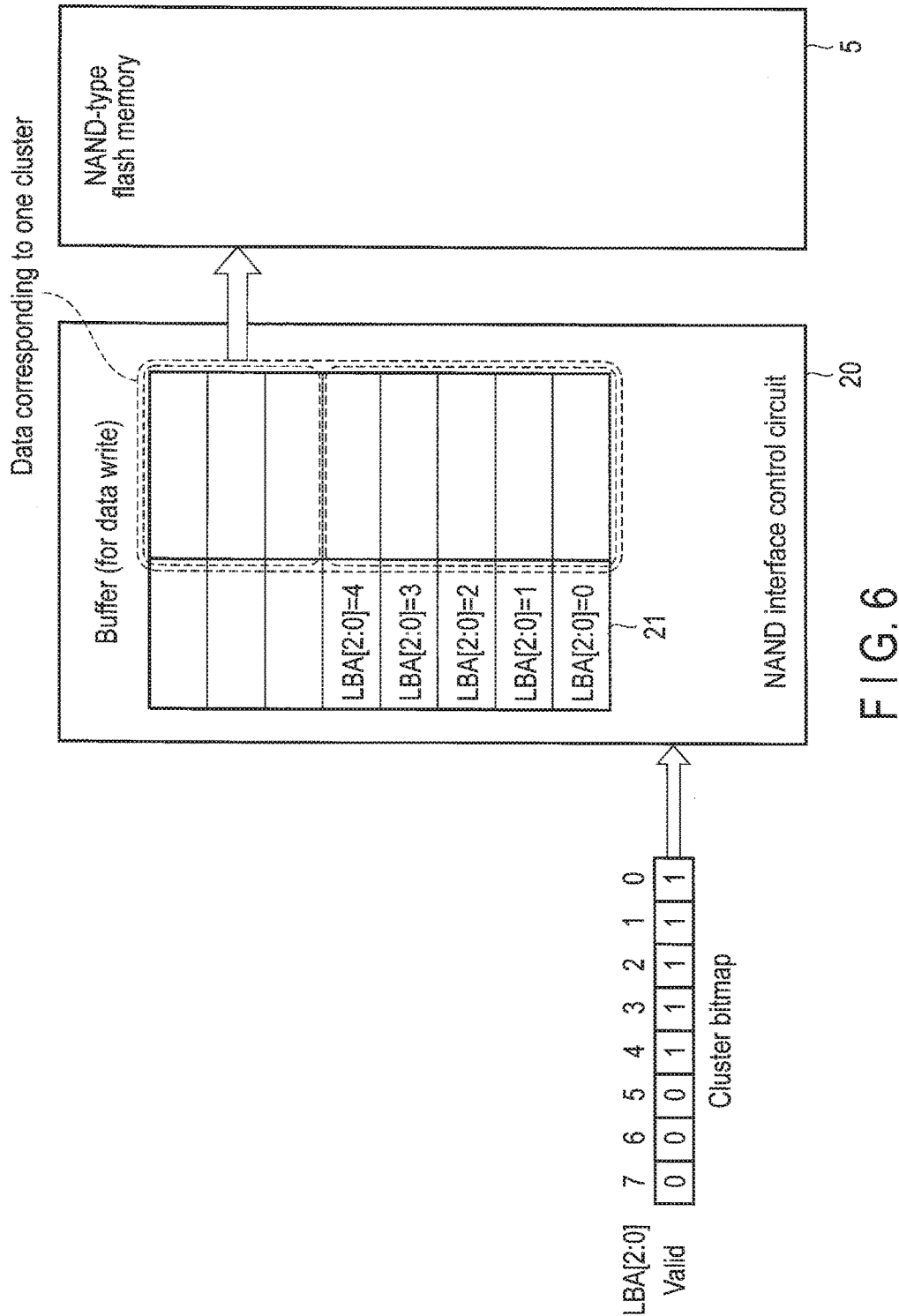
F I G. 6

Skip mask 100

| LBA | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Valid | 1 | 0 | 1 | 1 | 0 | 0 | 1 | 1 | 1 | 0 | 1 | 1 | 0 | 1 | 0 | 0 | 1 | 0 | 1 | 1 |

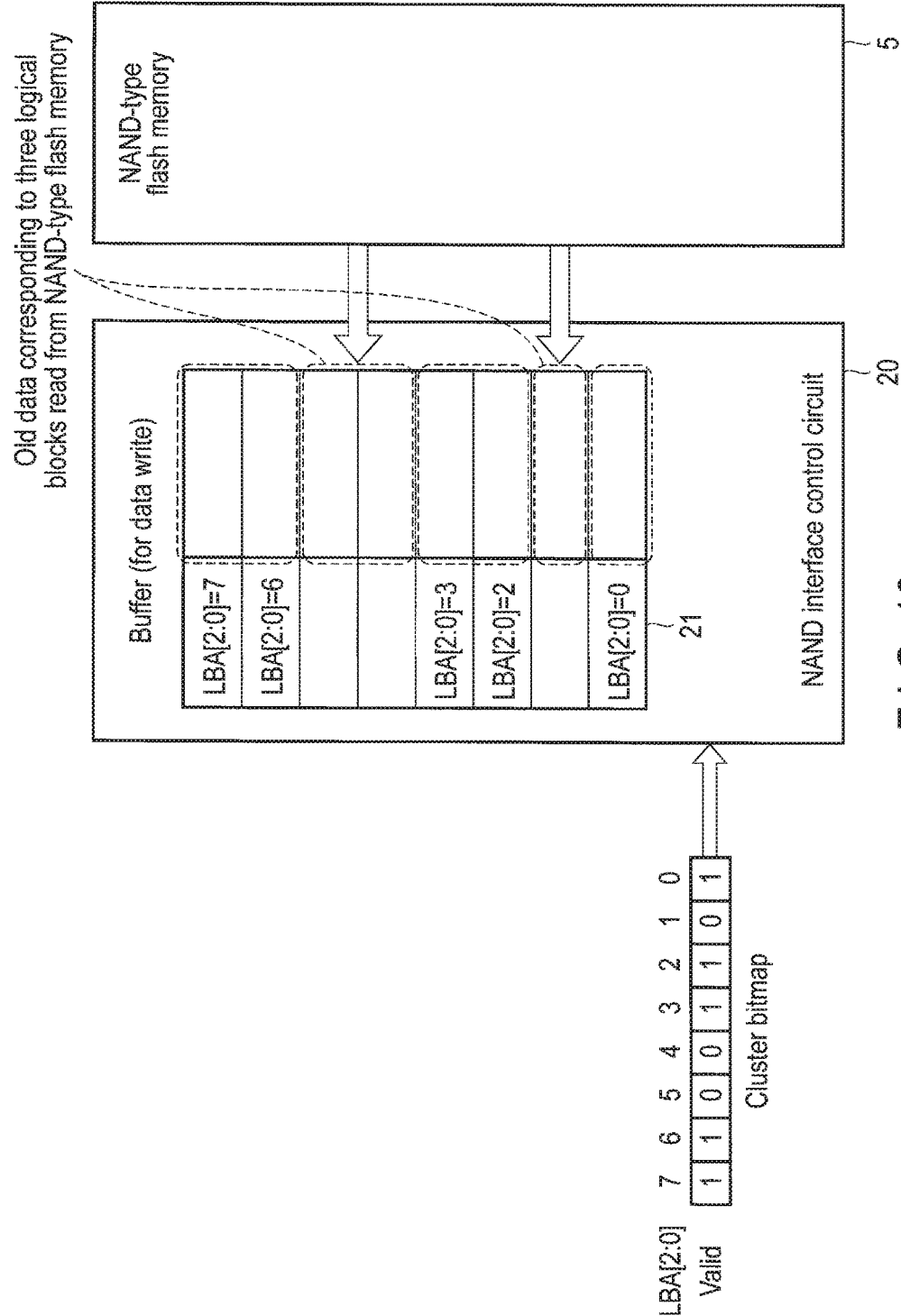
F I G. 10

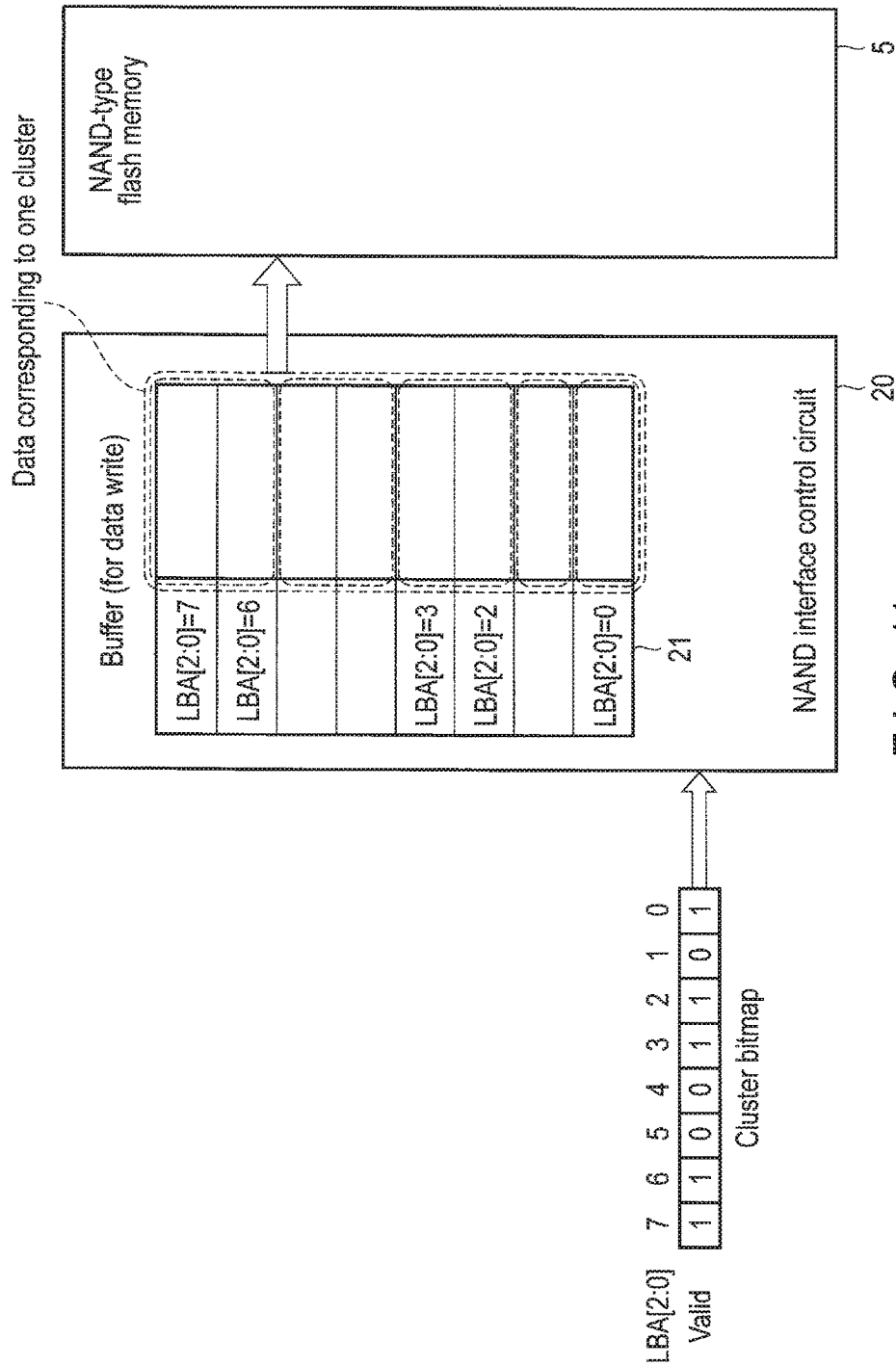
F I G. 11

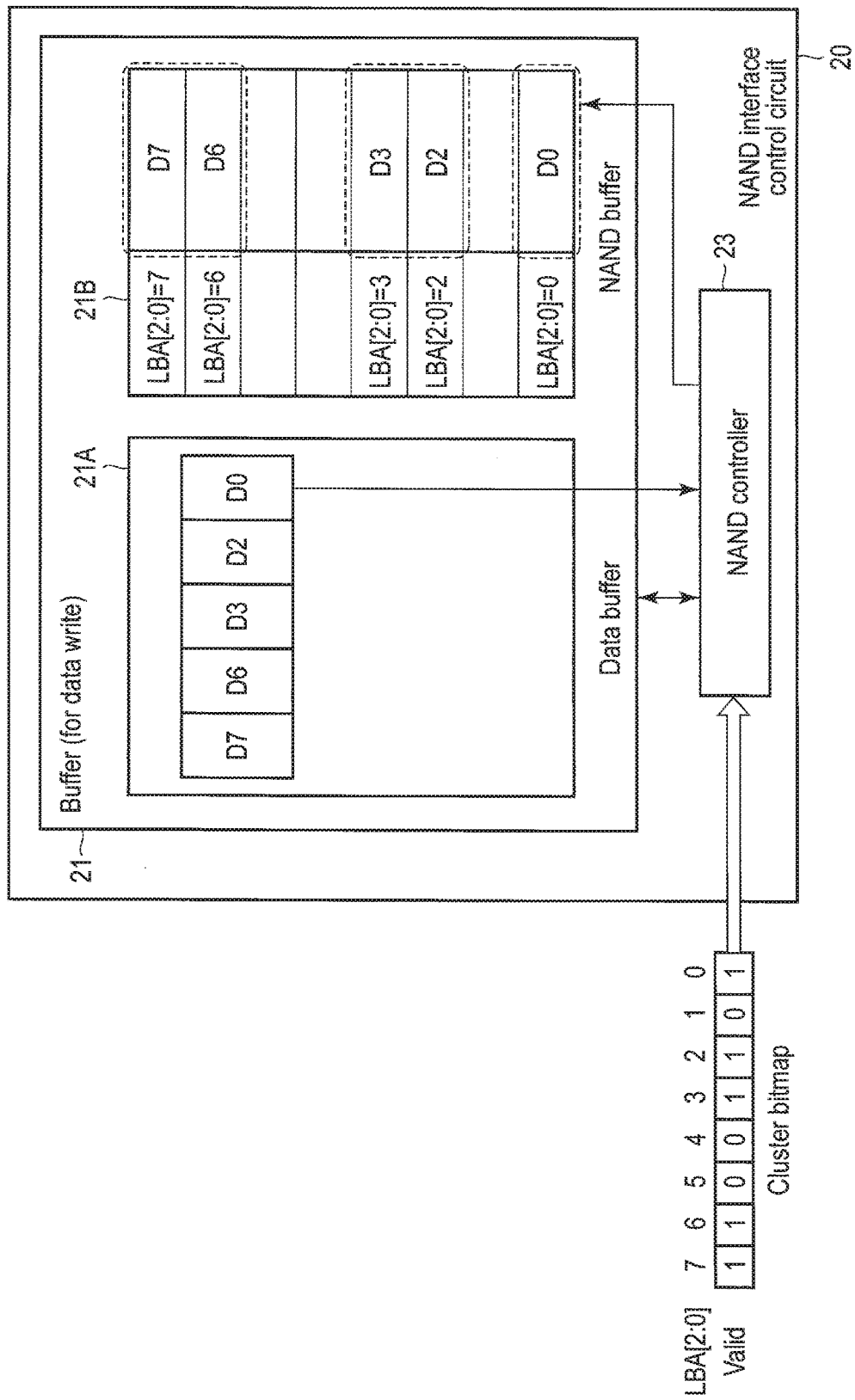
F I G. 12

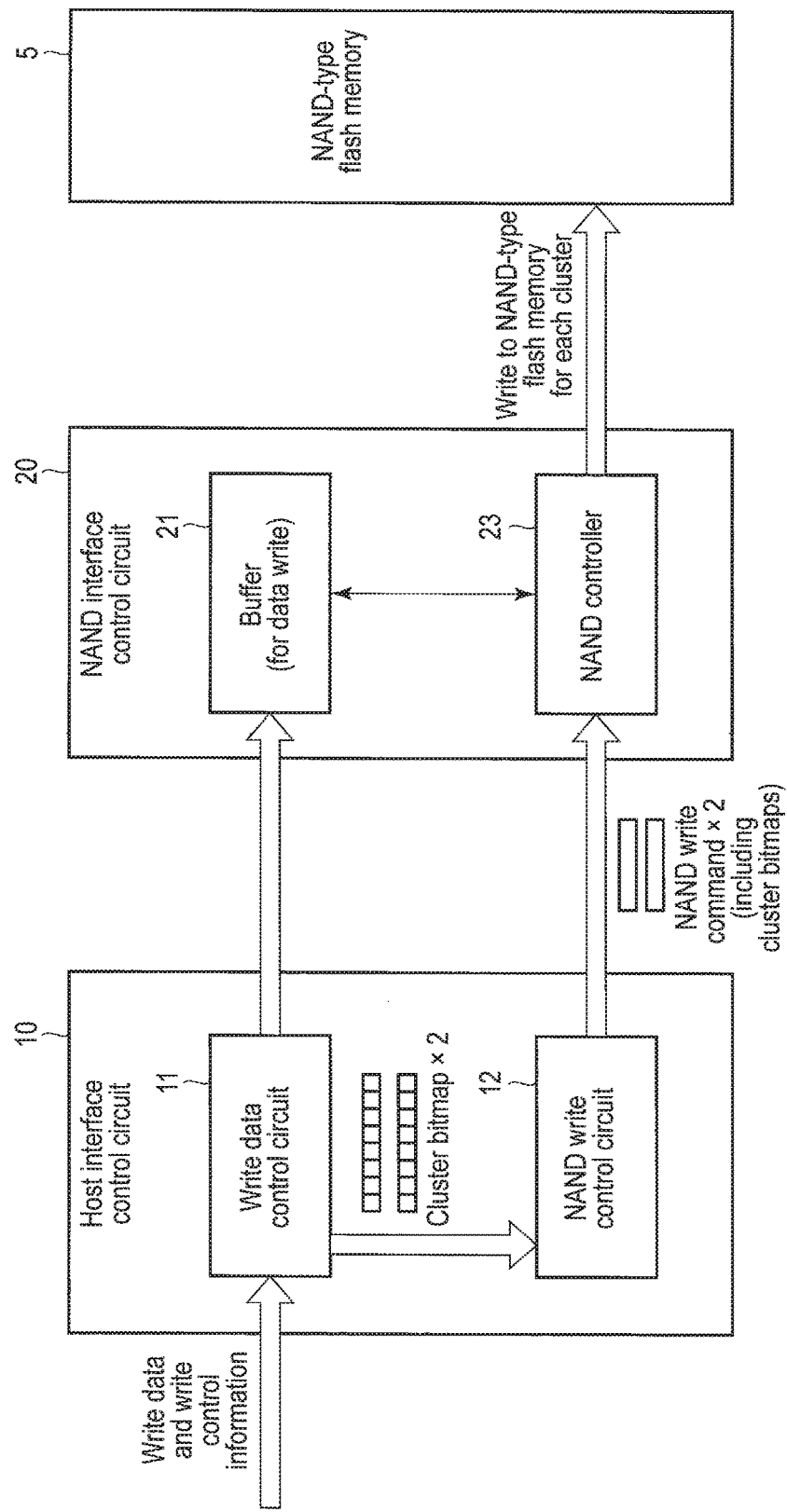
F I G. 13

| Skip mask 100 | | | | | | | | | | | | | | | | | |
|---|---|---|---|---|---|---|---|---|---|---|---|---|---|---|---|---|---|
| LBA[log2(N+1)-1:0] | 0 | 1 | 2 | 3 | 4 | 5 | 6 | 7 | 8 | 9 | 10 | 11 | 12 | 13 | 14 | 15 | ... | N |
| Valid | 1 | 0 | 1 | 1 | 0 | 1 | 0 | 0 | 0 | 0 | 0 | 0 | 0 | 0 | 0 | 0 | ... | 1 |

F I G. 14

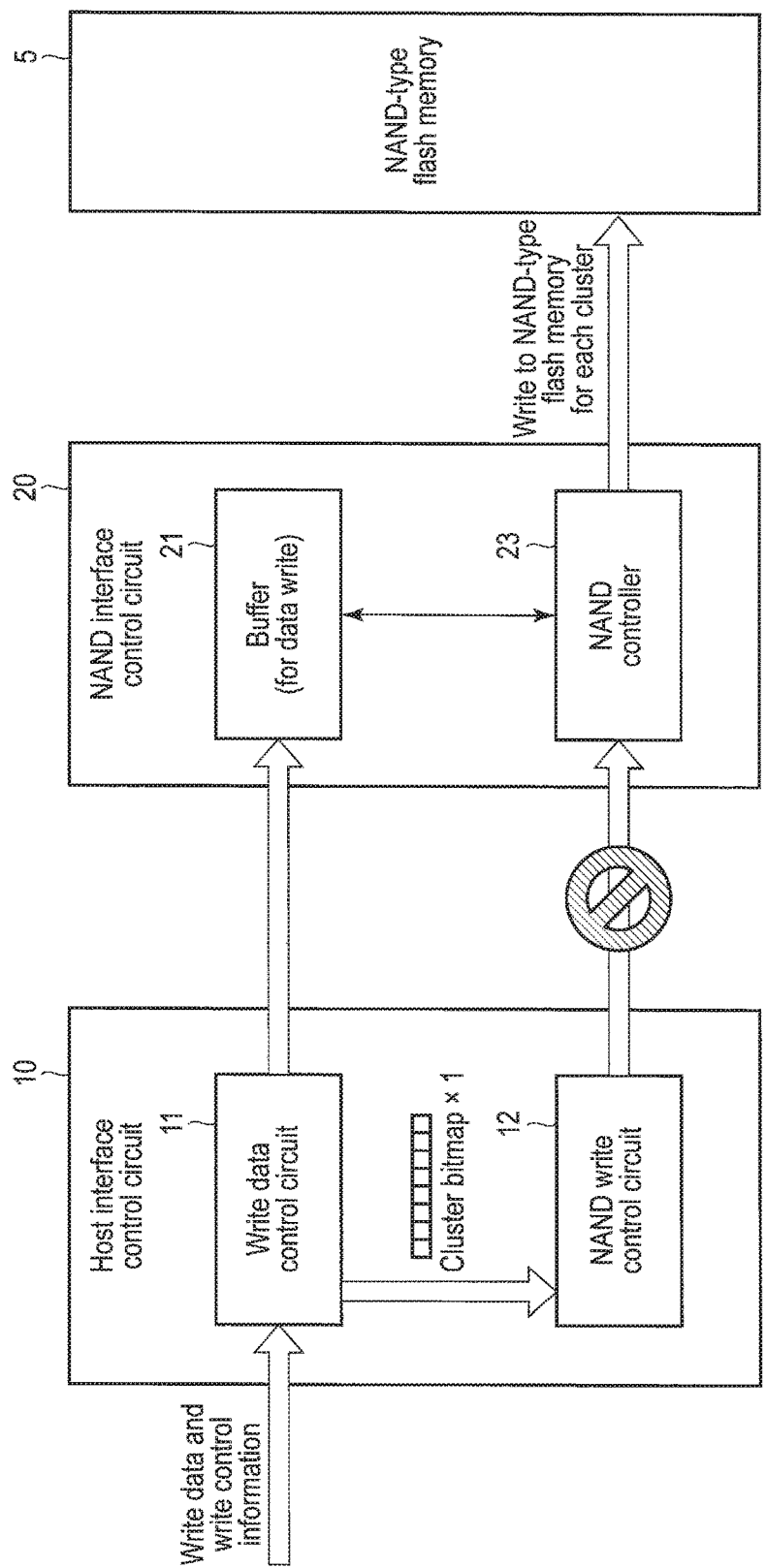
F I G. 15

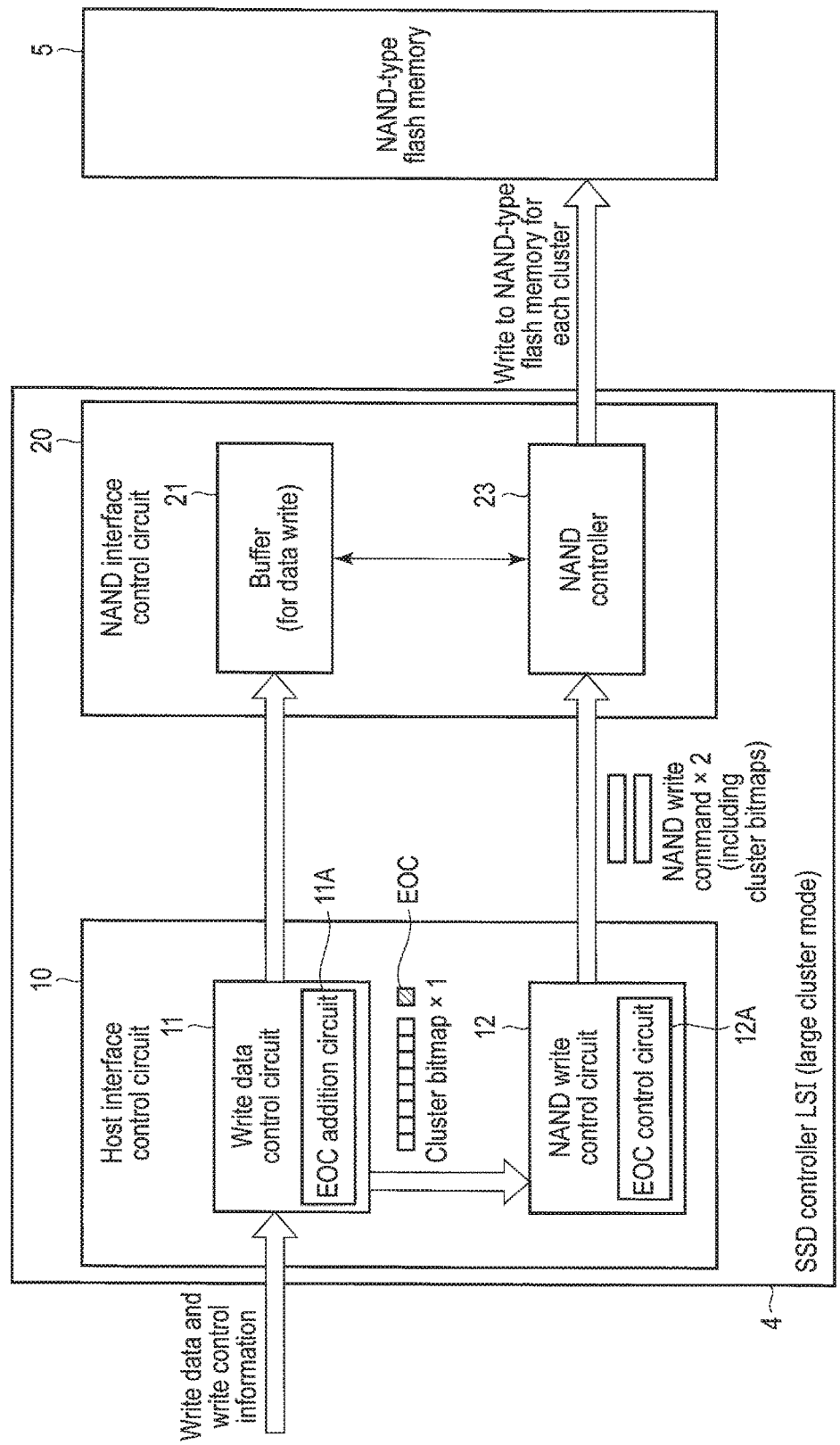
F I G. 16

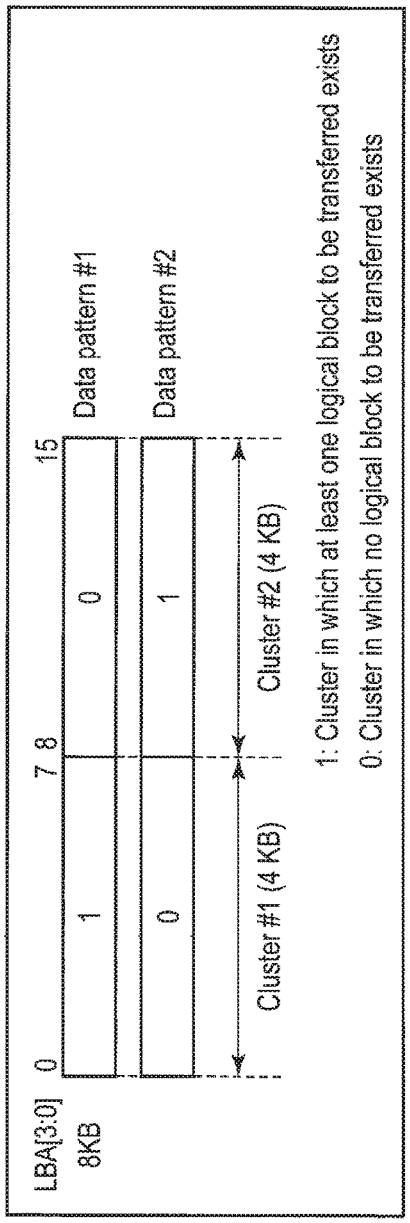
F I G. 17
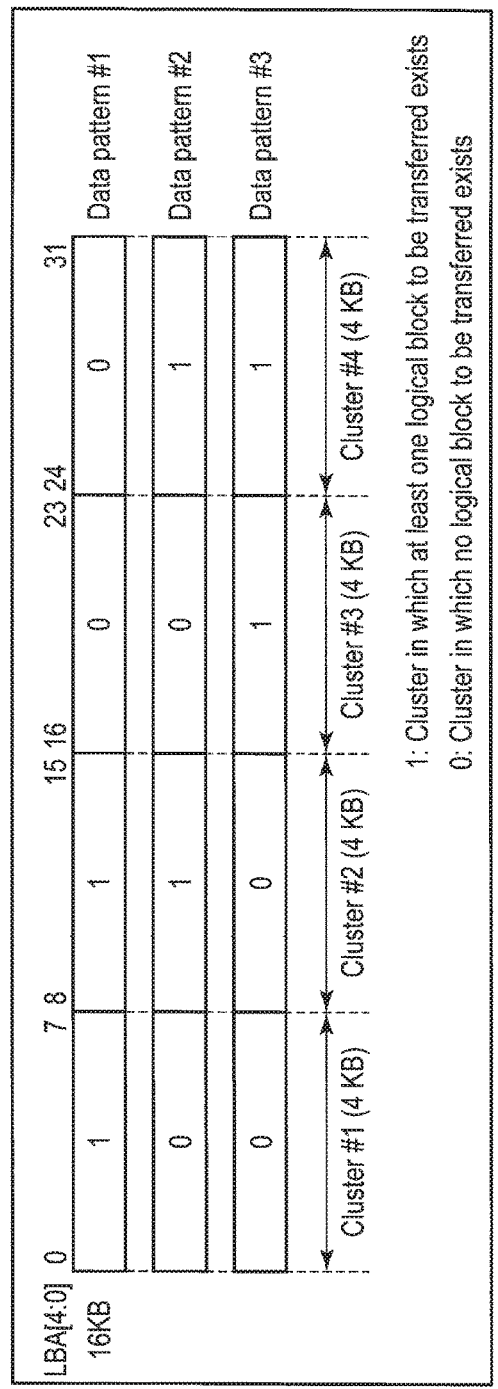
F I G. 18

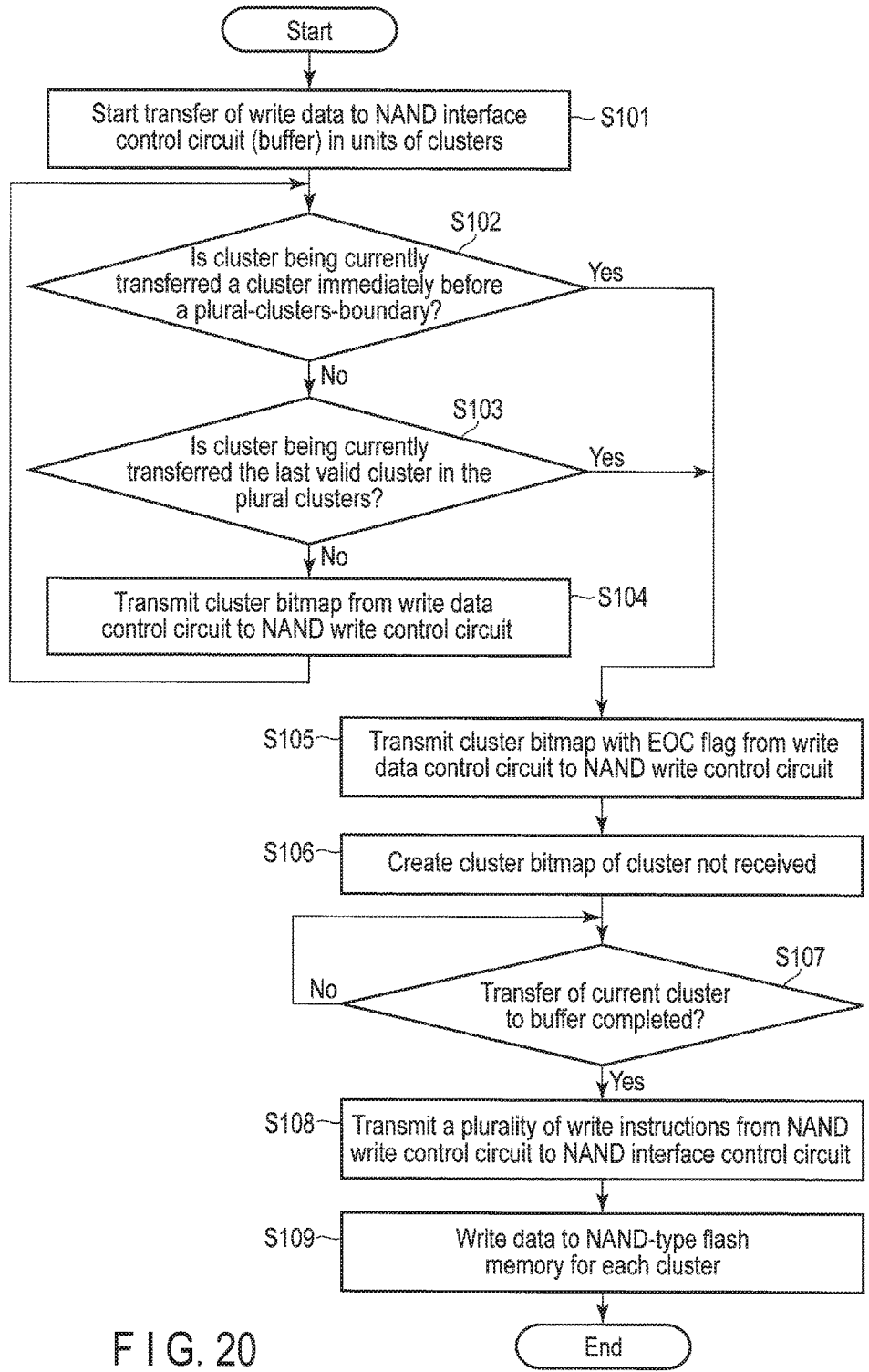
F I G. 20

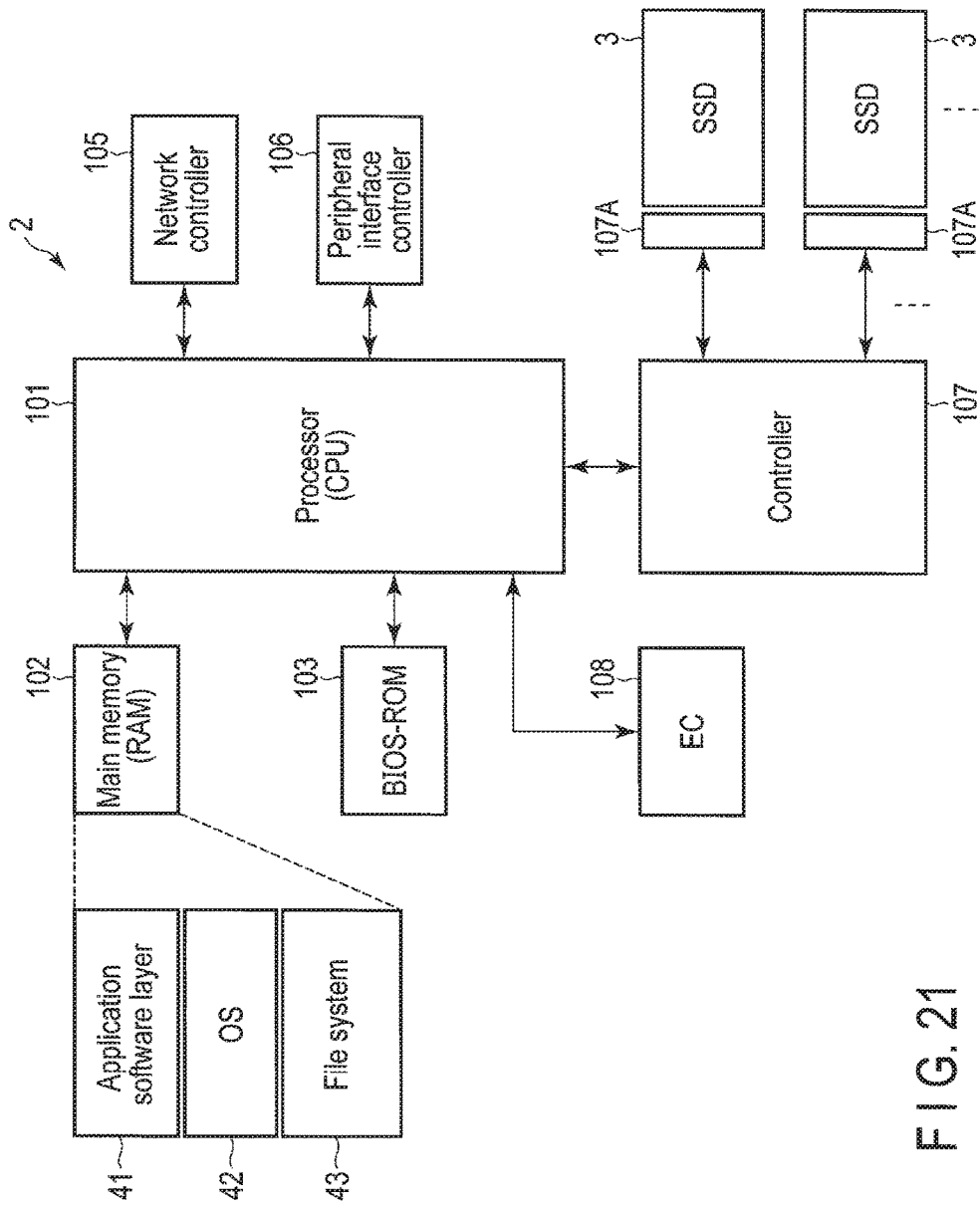
F I G. 21

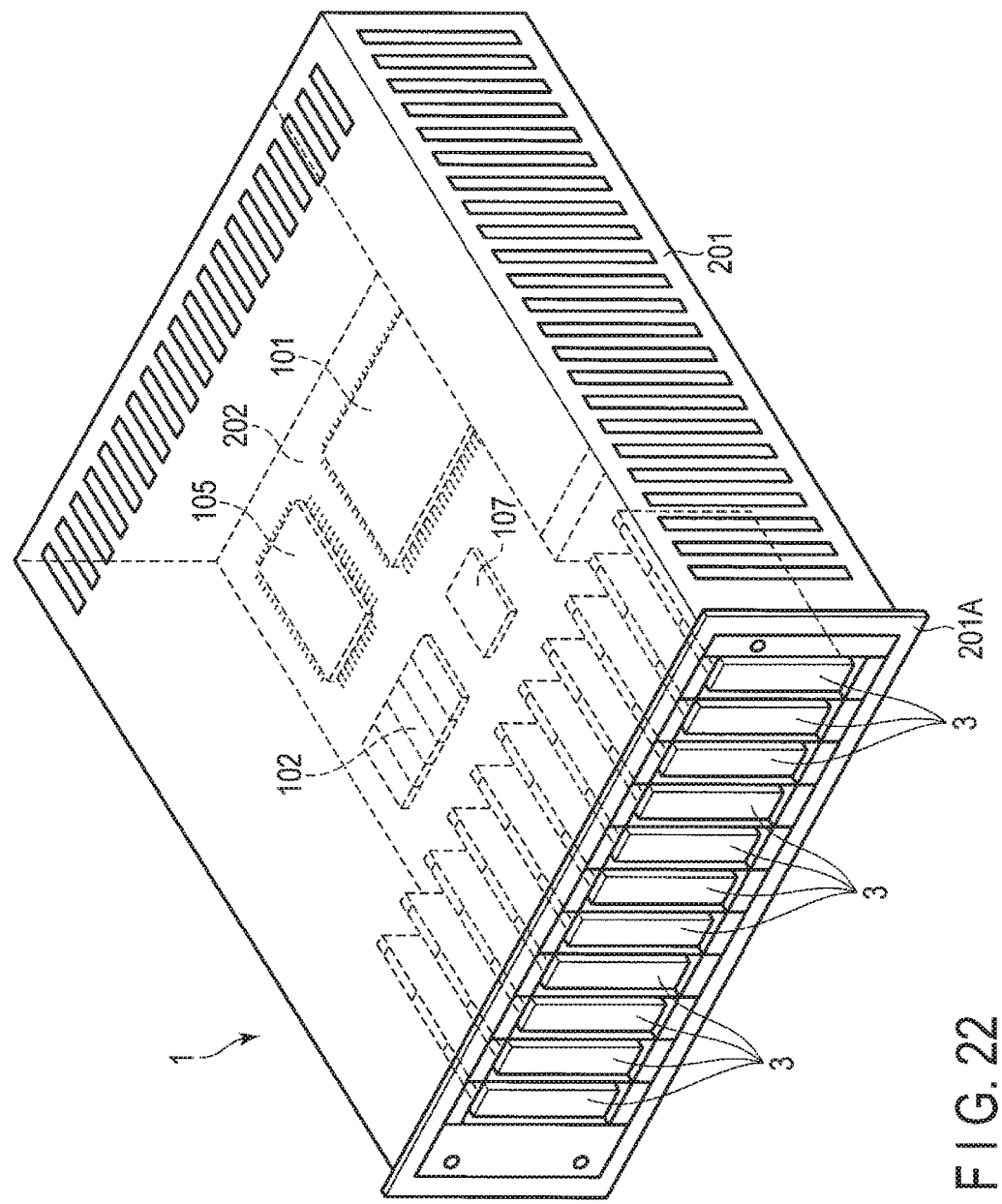
F I G. 22

STORAGE DEVICE AND CONTROL METHOD OF THE SAME

CROSS-REFERENCE TO RELATED APPLICATIONS

This application claims the benefit of U.S. Provisional Application No. 62/428,574, filed Dec. 1, 2016, the entire contents of which are incorporated herein by reference.

FIELD

Embodiments described herein relate generally to a technique for controlling a nonvolatile memory.

BACKGROUND

In recent years, storage devices including nonvolatile memories are widespread.

As one of such storage devices, a solid state drive (SSD) including a NAND-type flash memory is known. The SSD is used as a main storage of various computing devices because it has the features of low power consumption and high performance.

In a hard disk drive (HDD) conventionally used as a storage device, a skip write command is used in some cases in order to prevent performance deterioration due to the head seek or the like. The skip write command enables a host to transfer non-contiguous data (non-contiguous logical blocks) to a storage device.

Accordingly, in an SSD too, it is required that a skip write command be supported in order to enable the host to transfer non-contiguous data to a storage device.

BRIEF DESCRIPTION OF THE DRAWINGS

FIG. 1 is a block diagram showing a configuration example of a storage device according to an embodiment.

FIG. 2 is a block diagram showing a relationship between a host interface control circuit and a NAND interface control circuit in the storage device of the embodiment.

FIG. 3 is a view showing an operation of placing data corresponding to one cluster in a buffer, which is executed by the storage device of the embodiment.

FIG. 5 is a block diagram showing an operation of merging the data (new data) of FIG. 4 less than one cluster with data (old data) corresponding to the cluster read from a NAND-type flash memory.

FIG. 6 is a block diagram showing an operation of writing the data corresponding to one cluster created by the merge operation of FIG. 5 to a NAND-type flash memory.

FIG. 10 is a block diagram showing an operation of merging the data (non-contiguous new logical blocks) of FIG. 9 less than one cluster with data (old data) corresponding to the cluster read from the NAND-type flash memory, which is executed by the storage device of the embodiment.

FIG. 11 is a block diagram showing an operation of writing the data corresponding to one cluster created by the merge operation of FIG. 10 to a NAND-type flash memory.

FIG. 12 is a block diagram showing a configuration example of the buffer.

FIG. 13 is a block diagram showing a data write operation executed by the storage device of the embodiment in a mode in which plural clusters (large cluster) is made a write unit of one time.

FIG. 14 is a view showing an example of a skip mask by which data corresponding to one cluster included in the plural clusters (large cluster) is skipped.

FIG. 15 is a view for explaining a case where data corresponding to one cluster included in the plural clusters (large cluster) is skipped, whereby NAND write command transmission timing is made undefined.

FIG. 16 is a view showing a NAND write command transmission operation executed by a host interface control circuit in the storage device of the embodiment.

FIG. 17 is a view showing some data patterns associated with 8 KB data to be used in a mode in which two clusters (8 KB large cluster) are made a write unit of one time.

FIG. 18 is a view showing some data patterns associated with 16 KB data to be used in a mode in which four clusters (16 KB large cluster) are made a write unit of one time.

FIG. 20 is a flowchart showing a procedure for a skip write operation executed by the storage device of the embodiment in a mode in which the plural clusters (large cluster) is made a write unit of one time.

FIG. 21 is a block diagram showing a configuration example of a host to which the storage device of the embodiment is applied.

FIG. 22 is a view showing a configuration example of a computer including a host and the storage device of the embodiment.

DETAILED DESCRIPTION

Figure 4:
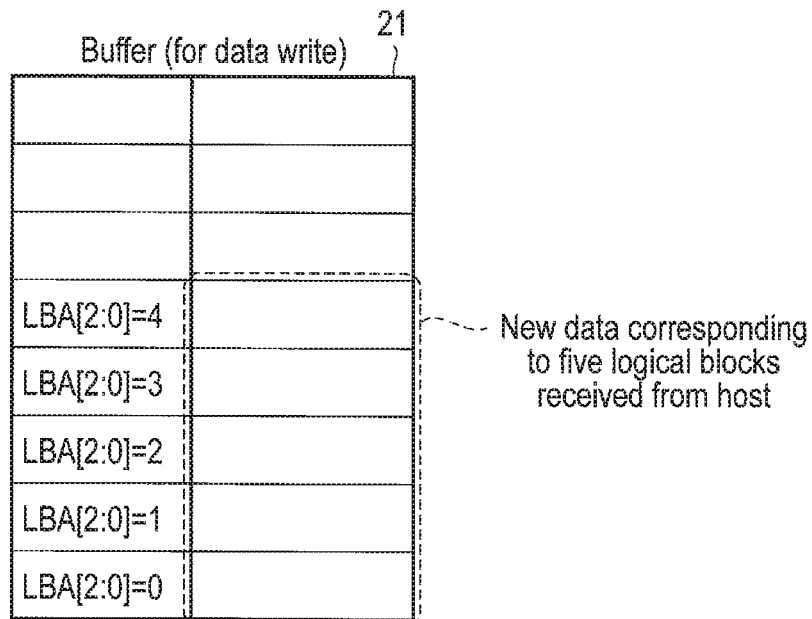
FIG. 4 is a block diagram showing an operation of placing data (new data) less than one cluster in a buffer, which is executed by the storage device of the embodiment.

Various embodiments will be described below with reference to the accompanying drawings.

In general, according to one embodiment, a storage device comprises a nonvolatile memory and a controller electrically connected to the nonvolatile memory. The controller has a first mode to manage mapping between logical addresses and physical addresses of the nonvolatile memory in units of first management sizes corresponding to a cluster including a plurality of logical blocks, and a second mode to manage mapping between the logical addresses and the physical addresses of the nonvolatile memory in units of second management sizes corresponding to a plurality of clusters in order to reduce the number of the physical addresses of the nonvolatile memory to be managed. The controller includes a host interface control circuit configured to transfer write data received from a host to a buffer, and a memory interface control circuit configured to write data corresponding to one cluster to the nonvolatile memory by using the write data in the buffer on the basis of one write instruction received from the host interface control circuit.

When, within a period during which the controller is in the second mode, a skip Write command with a skip mask indicating logical blocks to be transferred is received from the host, the host interface control circuit transfers write data received from the host to the buffer in units of clusters. The host interface control circuit determines whether or not a cluster being currently transferred is a last valid cluster in the plurality of clusters, which includes data to be written, by referring to the contents of the skip mask associated with each cluster subsequent to the cluster being currently transferred. The host interface control circuit transmits, when the cluster being currently transferred is the last valid cluster in the plurality of clusters, a plurality of write instructions corresponding to the plurality of clusters to the memory interface control circuit.

First, with reference to FIG. 1, a configuration of an information processing system 1 including a storage device according to one embodiment will be described below.

This storage device is a semiconductor storage device configured to write data to a nonvolatile memory, and read data from the nonvolatile memory. This storage device is realized as, for example, a NAND flash technology based solid state drive (SSD) 3.

The information processing system 1 includes a host (host device) 2 and the SSD 3. The host 2 is an information processing apparatus such as a server, and personal computer.

The SSD 3 can be used as a main storage of the information processing apparatus functioning as the host 2. The SSD 3 may be incorporated in the host 2 (information processing apparatus) or may be connected to the host 2 (information processing apparatus) through a cable or a network.

As an interface configured to connect the host 2 and the SSD 3 to each other, SCSI, Serial Attached SCSI (SAS), ATA, Serial ATA (SATA), PCI Express (PCIe), Ethernet (registered trade mark), Fibre channel, NVM Express (NVMe), and the like can be used.

The SSD 3 includes a controller 4 and a nonvolatile memory (NAND-type flash memory) 5. The SSD 3 may include a dynamic random access memory (DRAM) 6. The NAND-type flash memory 5 may include a plurality of NAND-type flash memory chips although this is not limited to it.

The NAND-type flash memory 5 includes a large number of NAND blocks (blocks). These blocks each function as an erase unit. A block is sometimes called "physical block" or an "erase block".

Each block includes a large number of pages (physical pages). In the NAND-type flash memory 5, read of data and write of data are executed in units of pages. An erase operation for erasing data is executed in units of blocks.

A storage area of the NAND-type flash memory 5 includes a user data area and a system area. The user data area is used by the host 2 to store therein user data. The system area is used to store therein management information such as an address translation table 61. The address translation table 61 manages mapping between logical addresses and physical addresses of the NAND-type flash memory 5 in units of set management sizes. The address translation table 61 is also called a logical-to-physical address translation table (L2P table). A physical address corresponding to a certain logical address indicates a physical storage location in the NAND-type flash memory 5 to which data of this logical address has been written. As a logical address, normally a logical block address (LBA) is used. An LBA is expressed by serial number to be given to a logical block (sector). The serial numbers start from zero. The size of each logical block (sector) is, for example, 512 bytes (512 B). The address translation table 61 may be loaded from the NAND-type flash memory 5 into the DRAM 6 at the time of power-on of the SSD 3.

The controller 4 is electrically connected to the NAND-type flash memory 5. The controller 4 may be realized by one LSI (SSD controller LSI) configured to control the NAND-type flash memory 5. This controller 4 (hereinafter referred to as an SSD controller LSI) has a first mode (hereinafter referred to as a small cluster mode) in which mapping between the logical addresses and the physical addresses of the NAND-type flash memory 5 is managed in units of first management sizes (for example, in units of 4 KB) corresponding to one cluster, and a second mode (hereinafter referred to as a large cluster mode) in which mapping between the logical addresses and the physical addresses of the NAND-type flash memory 5 is managed in units of second management sizes (for example, in units of 8 KB, 16 KB or the like) corresponding to plural clusters in order to reduce the number of physical addresses of the NAND-type flash memory 5 to be managed.

One cluster typically includes eight logical blocks (i.e., eight sectors). For example, when the size of one logical block is 512 bytes (512 B), the size of one cluster becomes 4096 bytes (4 KB). In the following description, a case where the size of one cluster is 4096 bytes (4 KB) is assumed although the size is not limited to it.

In the small cluster mode, one cluster is assigned to one logical address. Write of data to the NAND-type flash memory 5 is controlled in units of clusters (in units of 4 KB), and 4-KB data is written to the NAND-type flash memory 5. That is, 4-KB data becomes a write unit of one time. When write data of less than 4 KB is to be written, write data (4-KB data) corresponding to one cluster is created by merging this write data with data (old data) corresponding to the cluster read from the NAND-type flash memory 5, and the created data (4-KB data) corresponding to one cluster is written to the NAND-type flash memory 5 (read-modified-write). Then, the address translation table 61 is updated, and the logical address corresponding to the cluster is associated with a physical address indicating a physical storage location of the NAND-type flash memory 5 to which the write data (4-KB data) corresponding to one cluster has been written.

In the large cluster mode, a plurality of clusters (large cluster) is assigned to one logical address. The large cluster may include two clusters (sixteen logical blocks). In this case, the size of one large cluster is 8 KB. Alternatively, the large cluster may include four clusters (thirty-two logical blocks). In this case, the size of one large cluster is 16 KB. It should be noted that the number of clusters included in the large cluster is not limited to a power of two.

In the large cluster mode, it is required that write of data to the NAND-type flash memory 5 be controlled in units of large clusters (in units of 8 KB or in units of 16 KB).

When the size of one large cluster is 8 KB, 8-KB data becomes a write unit of one time. When write data (8-KB data) corresponding to one large cluster is written, the address translation table 61 is updated, and the logical address corresponding to the large cluster is associated with a physical address indicating a physical storage location of the NAND-type flash memory 5 to which the write data (8-KB data) corresponding to one large cluster has been written.

On the other hand, when the size of one large cluster is 16 KB, 16-KB data becomes a write unit of one time. When write data (16-KB data) corresponding to one large cluster is written, the address translation table 61 is updated, and the logical address corresponding to the large cluster is associated with a physical address indicating a physical storage location of the NAND-type flash memory 5 to which the write data (16-KB data) corresponding to one large cluster has been written.

Although the SSD controller LSI 4 is configured to operate in the small cluster mode by controlling write of data to the NAND-type flash memory 5 in units of clusters, the SSD controller LSI 4 can also operate in the large cluster mode by issuing a plurality of write instructions corresponding to a plurality of clusters included in the large cluster. The mode (the small cluster mode or the large cluster mode) in which the SSD controller LSI 4 should operate may also be set in advance at the time of shipment or the like of the SSD according to the product model of the SSD in which the SSD controller LSI 4 is incorporated. For example, when the SSD 3 is a large-capacity SSD, i.e., when a large-capacity NAND-type flash memory 5 is incorporated in the SSD 3, the number of physical addresses to be managed by the SSD controller LSI 4 is increased. In this case, the size of the address translation table 61 also becomes very large. Accordingly, when the SSD 3 is a large-capacity SSD, the SSD controller LSI 4 may be set to the large cluster mode in order to reduce the number of the physical addresses of the NAND-type flash memory 5 which needs to be managed by the SSD controller LSI 4. Thereby, a large-capacity SSD can be realized without causing an increase in the size of the address translation table 61.

The SSD controller LSI 4 includes a host interface control circuit 10 and a NAND interface control circuit 20. The host interface control circuit 10 executes communication with the host 2, and transfers write data received from the host 2 to a buffer 21 for data write in units of clusters. The buffer 21 for data write may be provided in, for example, the NAND interface control circuit 20. The NAND interface control circuit 20 functions as a memory interface control circuit configured to control the NAND-type flash memory 5. This NAND interface control circuit 20 controls write of data to the NAND-type flash memory 5 in units of clusters. Each time one write instruction (hereinafter referred to as a NAND write command) is received from the host interface control circuit 10, the NAND interface control circuit 20 writes data (4-KB data) corresponding to one cluster to the NAND-type flash memory 5 by using write data in the buffer 21 on the basis of the received NAND write command. When the size of the write data is less than 4 KB, the NAND interface control circuit 20 executes the aforementioned read-modified-write.

Further, upon receipt of a read instruction (hereinafter referred to as a NAND read command) from the host interface control circuit 10, the NAND interface control circuit 20 refers to the address translation table 61 to thereby obtain a physical address corresponding to a logical address specified by the NAND read command, and reads data from a storage location in the NAND-type flash memory 5 specified by the physical address. The read data is stored in a buffer 22 for data read.

First, a basic mode (small cluster mode) in which write of data to the NAND-type flash memory 5 is controlled in units of clusters will be described below.

FIG. 2 shows a relationship between the host interface control circuit 10 and the NAND interface control circuit 20.

The host interface control circuit 10 includes a write data control circuit 11 and a NAND write control circuit 12. The write data control circuit 11 mainly carries out control of transferring write data received from the host 2 to the buffer 21 for data write in the NAND interface control circuit 20. The NAND write control circuit 12 mainly carries out control for transmitting to the NAND interface control circuit 20 a NAND write command to write the write data in the buffer 21 to the NAND-type flash memory 5.

Upon receipt of write data from the host 2, the write data control circuit 11 starts an operation of transferring the received write data to the buffer 21 in units of clusters.

In this case, the write data control circuit 11 may firstly transmit, to the NAND write control circuit 12, a cluster bitmap with information indicating a write-destination logical address (write-destination LBA) of data corresponding to the next one cluster to be transferred. The cluster bitmap includes a bitmap indicating each of logical blocks to be transferred in the corresponding cluster. Subsequently, the write data control circuit 11 may transfer the abovementioned data corresponding to one cluster to the buffer 21.

When the NAND write control circuit 12 receives, from the write data control circuit 11, a signal indicating that transfer of the data corresponding to one cluster to the buffer 21 has been completed, the NAND write control circuit 12 transmits to the NAND interface control circuit 20 a NAND write command to write the data corresponding to one cluster. This NAND write command may include a write-destination LBA, the aforementioned cluster bitmap, and the like. It should be noted that when the NAND interface control circuit 20 has a function of assuring that the NAND interface control circuit 20 surely carries out processing of the NAND write command after receiving the data corresponding to one cluster, the NAND write control circuit 12 may not wait for completion of the transfer of the data corresponding to one cluster.

Each time the NAND interface control circuit 20 receives a NAND write command, the NAND interface control circuit 20 writes data corresponding to one cluster to the NAND-type flash memory 5. This NAND interface control circuit 20 includes a NAND controller 23. In response to reception of a NAND write command from the NAND write control circuit 12, the NAND controller 23 writes data corresponding to one cluster to the NAND-type flash memory 5 by using write data in the buffer 21. When the write data in the buffer 21 is data less than one cluster, the NAND controller 23 merges the write data with data (old data) corresponding to the cluster read from the NAND-type flash memory 5 to thereby create data (4-KB data) corresponding to one cluster, and writes the created data (4-KB data) corresponding to one cluster to the NAND-type flash memory 5 (read-modified-write).

By a series of operations described above, the write data from the host 2 is written to the NAND-type flash memory 5 for each cluster.

FIG. 3 shows an operation of placing data corresponding to one cluster in the buffer 21, which is executed by the NAND interface control circuit 20. It should be noted that although a case where the NAND interface control circuit 20 has a buffer corresponding to one cluster is shown in the description, the NAND interface control circuit 20 may be configured to include a buffer corresponding to plural clusters.

The write data is written to the NAND-type flash memory 5 in units of clusters, and hence the NAND controller 23 of the NAND interface control circuit 20 creates a write image (NAND write image) corresponding to one cluster on the buffer 21 on the basis of a cluster bitmap. The cluster bitmap indicates logical blocks to be transferred (to be written) in the eight logical blocks included in one cluster. The eight logical blocks included in one cluster can be distinguished from each other by lower-order three bits (LBA[2:01]) of the LBA of the cluster. The cluster bitmap includes eight bits (hereinafter referred to as valid bits) corresponding to the eight logical blocks. A valid bit of "1" indicates that a corresponding logical block is a logical block to be transferred, i.e., that the corresponding logical block includes valid data to be written. A valid bit of "0" indicates that a corresponding logical block is not a logical block to be transferred, i.e., that the corresponding logical block does not include valid data to be written. It should be noted that meanings of "1" and "0" may be opposite to those described above. In this case, the bit of "1" (skip bit of "1") indicates that a corresponding logical block is not a logical block to be transferred, i.e., that the corresponding logical block does not include valid data to be written. The bit of "0" (skip bit of "0") indicates that a corresponding logical block is a logical block to be transferred, i.e., that the corresponding logical block includes valid data to be written.

When all the eight logical blocks of the write data are logical blocks to be transferred, all the eight valid bits of the cluster bitmap become "1" (cluster bitmap="1, 1, 1, 1, 1, 1, 1, 1"). When the value of the 8-bit cluster bitmap is described in hexadecimal notation, the cluster bitmap becomes "FF" (cluster bitmap="FF").

When the cluster bitmap is "FF" (cluster bitmap="FF"), a NAND write image corresponding to one cluster is created by using only eight contiguous logical blocks (new data) transferred from the write data control circuit 11 to the buffer 21, and the NAND write image corresponding to one cluster (data corresponding to one cluster) is written to the NAND-type flash memory 5.

FIG. 4 shows an operation of placing data (new data) less than one cluster in the buffer 21, which is executed by the NAND interface control circuit 20.

There is sometimes a case where the first LBA or the last LBA to which write data should be written does not coincide with the cluster boundary. In this case, regarding the first cluster or the last cluster of the write data, some contiguous logical blocks are not received from the host 2. That is, there is sometimes a case where the first cluster or the last cluster includes only data (new data) less than one cluster. A cluster bitmap corresponding to a cluster (the first cluster or the last cluster of the write data) including only data (new data) less than one cluster includes at least one valid bit of "0" indicating that valid data does not exist. Accordingly, this cluster bitmap has a value other than "FF".

In FIG. 4, a case where the cluster of the current write target includes only write data (new data) corresponding to five contiguous logical blocks received from the host 2 is shown. As described above, eight logical blocks in one cluster can be distinguished from each other by lower-order three bits (LBA[2:0]) of the LBA of the cluster. In FIG. 4, the write data received from the host 2 includes only the first logical block (LBA[2:0]=0), second logical block (LBA[2:0]=1), third logical block (LBA[2:0]=2), fourth logical block (LBA[2:0]=3), and fifth logical block (LBA[2:0]=4).

In this case, as shown in FIG. 5, a cluster bitmap indicating that valid data exist only in the first to fifth logical blocks is transmitted to the NAND interface control circuit 20. Based on this cluster bitmap, the NAND interface control circuit 20 places only the write data corresponding to five logical blocks of the first to fifth logical blocks in the buffer 21. Furthermore, based on this cluster bitmap, the NAND interface control circuit 20 reads old data corresponding to the cluster of the current write target from the NAND-type flash memory 5, and writes data corresponding to three logical blocks of the sixth to eighth logical blocks in the old data to the buffer 21. Thereby, the write data corresponding to the contiguous five logical blocks received from the host 2 is merged with the old data corresponding to the three logical blocks. Then, the NAND interface control circuit 20 writes the data corresponding to one cluster, which is created by the merge operation of FIG. 5, to the NAND-type flash memory 5 as shown in FIG. 6.

[Skip Write Command]

Next, the skip write command supported by the SSD 3 will be described below.

As described previously, the skip write command enables the host 2 to transfer non-contiguous data (non-contiguous logical blocks) to the SSD 3. When requiring write of non-contiguous data, the host 2 transmits, to the SSD 3, a skip write command with a skip mask indicating logical blocks to be transferred.

Figures 7, 8:
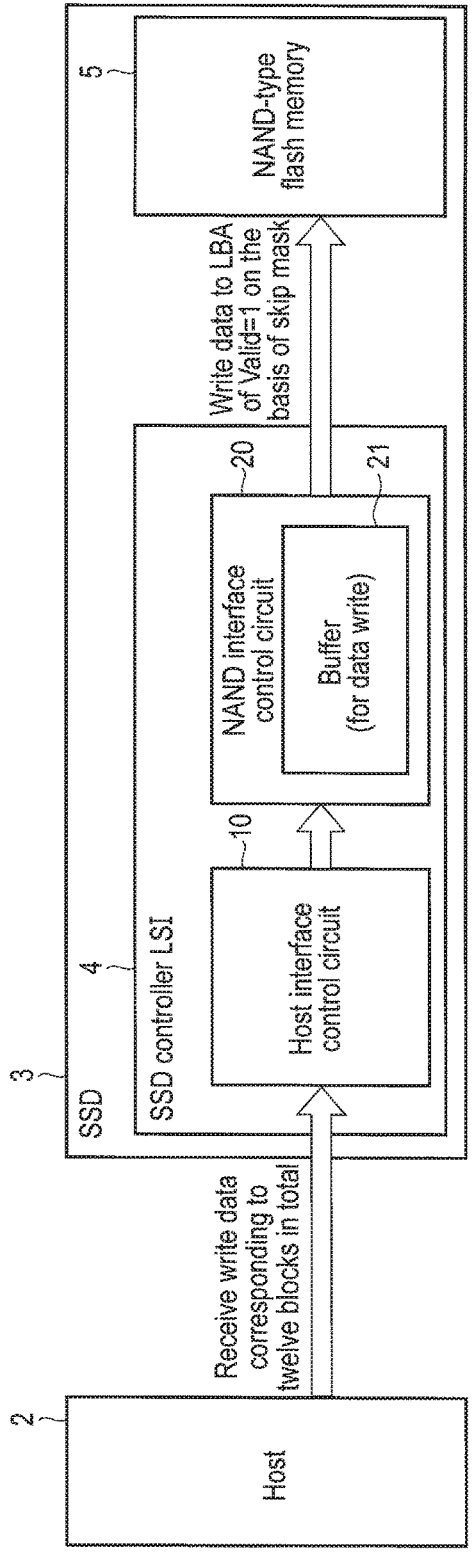
FIG. 7 is a view showing a skip mask included in a skip write command to be applied to the storage device of the embodiment.
FIG. 8 is a block diagram showing a write operation which is executed by the storage device of the embodiment in response to reception of a skip write command with the skip mask of FIG. 7.

FIG. 7 shows an example of a skip mask 100 included in a skip write command.

The skip mask 100 includes a sequence of bits indicating logical blocks to be transferred (to be written). In this sequence of the bits (valid bits), a valid bit of "1" indicates a logical block to be transferred. A valid bit of "0" indicates a logical block to be skipped. Assuming that the maximum transfer length (the maximum number of logical blocks to be written) of write data per skip write command is N+1, the skip mask 100 may include a sequence of N+1 bits. Here, it is sufficient if N is an arbitrary integer greater than or equal to 1.

The first valid bit of "1" of this skip mask 100 corresponds to the first LBA to be transferred. The total number of valid bits of "1" included in the skip mask 100 coincides with the number of logical blocks to be written, i.e., the transfer length of the write data. The SSD 3 writes data (logical block) to only LBAs corresponding to the valid bits of "1" on the basis of the skip mask 100.

FIG. 8 shows a write operation which is executed by the SSD 3 in response to reception of a skip write command with the skip mask 100 of FIG. 7.

The skip mask 100 of the skip write command issued by the host 2 is saved in the host interface control circuit 10. The write data control circuit 11 of the host interface control circuit 10 divides the skip mask 100 into cluster units, and transmits the divided skip masks to the NAND write control circuit 12.

When the number of valid bits of "1" included in the skip mask 100 of FIG. 7 is 12, the SSD 3 receives write data corresponding to twelve logical blocks from the host 2. Data corresponding to the twelve logical blocks are consecutively transferred from the host 2 to the SSD 3. Then, the data corresponding to the twelve logical blocks received from the host 2 are transferred to the buffer 21 by the host interface control circuit 10. Then, these data corresponding to the twelve logical blocks are written to only LBAs associated with valid bits of "1".

Next, a write operation which is executed by the SSD 3 in response to reception of a skip write command will be described below by using FIGS. 9 to 11.

Figure 9:
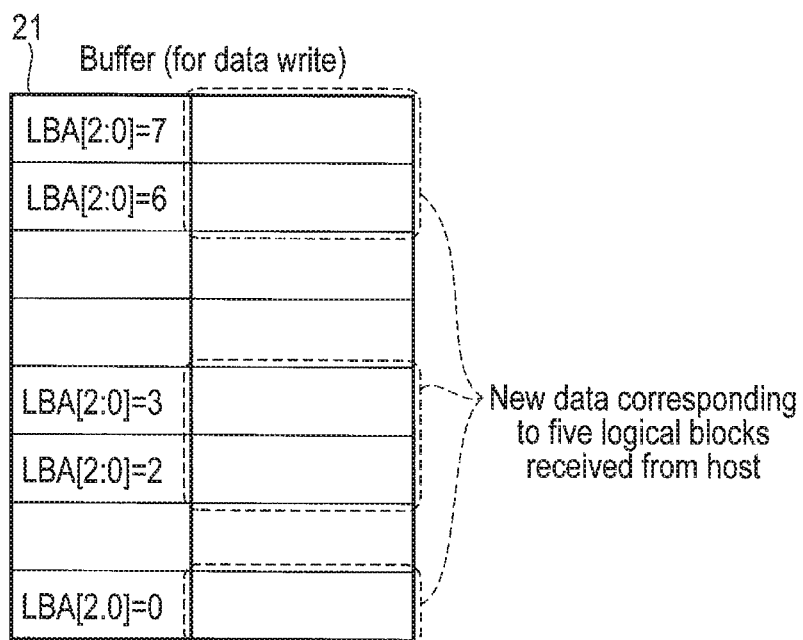
FIG. 9 is a block diagram showing an operation of placing data (non-contiguous new logical blocks) less than one cluster in a buffer, which is executed by the storage device of the embodiment in response to reception of a skip write command.

FIG. 9 shows an operation of placing data (non-contiguous new logical blocks) less than one cluster in the buffer 21, which is executed by the SSD 3 in response to reception of a skip write command.

When the received skip mask is the skip mask 100 of FIG. 7, the first cluster includes five logical blocks to be written to LBA[2:0]=0, LBA[2:0]=2, LBA[2:0]=3, LBA[2:0]=6, and LBA[2:0]=7. The NAND interface control circuit 20 of the SSD 3 places five logical blocks received from the host 2 in the buffer 21 as shown in FIG. 9 on the basis of a cluster bitmap corresponding to this first cluster.

The NAND interface control circuit 20 reads old data corresponding to the cluster of the current write target from the NAND-type flash memory 5 on the basis of this cluster bitmap, and writes data corresponding to three logical blocks, i.e., the second, fifth, and sixth logical blocks in the old data to the buffer 21 as shown in FIG. 10. Thereby, the write data corresponding to the five non-contiguous logical blocks received from the host 2 is merged with the old data corresponding to these three logical blocks. Then, the NAND interface control circuit 20 writes the data corresponding to one cluster created by the merge operation of FIG. 10 to the NAND-type flash memory 5 as shown in FIG. 11.

FIG. 12 shows a configuration example of the buffer 21.

The buffer 21 may include a data buffer 21A configured to store therein data transferred from the host interface control circuit 10, and a NAND buffer 21B configured to store therein the aforementioned NAND write image. The NAND buffer 21B includes eight storage regions configured to store therein eight logical blocks.

The NAND controller 23 of the NAND interface control circuit 20 determines each storage region on the NAND buffer 21B in which each of the five logical blocks in the data buffer 21A should be stored on the basis of the cluster bitmap. Here, in the cluster bitmap, the valid bit corresponding to the first logical block (LBA[2:0]=0) is "1", and hence the NAND controller 23 places the first logical block D0 stored in the data buffer 21A in the first storage region in the NAND buffer 21B.

The valid bit corresponding to the second logical block (LBA[2:0]=1) is "0", and hence no logical block is placed in the second storage region in the NAND buffer 21B.

The valid bit corresponding to the third logical block (LBA[2:0]=2) is "1", and hence the NAND controller 23 places the next logical block D2 stored in the data buffer 21A in the third storage region in the NAND buffer 21B.

The valid bit corresponding to the fourth logical block (LBA[2:0]=3) is "1", and hence the NAND controller 23 places the further next logical block D3 stored in the data buffer 21A in the fourth storage region in the NAND buffer 21B.

The valid bit corresponding to the fifth logical block (LBA[2:0]=4) is "0", and hence no logical block is placed in the fifth storage region in the NAND buffer 21B. Likewise, the valid bit corresponding to the sixth logical block (LBA[2:0]=5) is "0", and hence no logical block is placed in the sixth storage region in the NAND buffer 21B.

The valid bit corresponding to the seventh logical block (LBA[2:0]=6) is "1", and hence the NAND controller 23 places the further next logical block D6 stored in the data buffer 21A in the seventh storage region in the NAND buffer 21B.

The valid bit corresponding to the eighth logical block (LBA[2:0]=7) is "1", and hence the NAND controller 23 places the last logical block D7 stored in the data buffer 21A in the eighth storage region in the NAND buffer 21B.

[Operation of Large Cluster]

In order to make the SSD 3 having the aforementioned control structure operate in a mode (large cluster mode) in which a plurality of clusters is made a write unit of one time, the following control structure can be employed.

Hereinafter, a case where the number of clusters included in a large cluster is two (8-KB large cluster) will be mainly described.

For example, in a case where two clusters are made a write unit of one time (where the size of the large cluster is 8 KB), mapping between the logical addresses and the physical addresses is managed in units of 8 KB, and write of data to the NAND-type flash memory 5 is controlled in units of 8 KB. Accordingly, a cluster bitmap corresponding to 16 logical blocks becomes necessary per write unit of one time (per 8-KB large cluster). This is because in the large cluster mode of 8 KB, mapping between the logical addresses and the physical addresses is managed in units of 8 KB, and hence it is necessary to execute write of data to the NAND-type flash memory 5 in data units of 8 KB corresponding to the size of one large cluster.

FIG. 13 shows a data write operation executed by the SSD 3 in a mode (large cluster mode) in which plural clusters (large cluster) is made a write unit of one time.

In the SSD 3 of this embodiment, in order to make it possible to cope with an 8-KB large cluster while maintaining the basic configuration in which write of data to the NAND-type flash memory 5 is controlled in units of 4-KB clusters, a control structure in which two NAND write commands are transmitted from the host interface control circuit 10 to the NAND interface control circuit 20 per write unit of one time (per 8-KB large cluster) is employed. It is sufficient if each of the two NAND write commands includes only a cluster bitmap corresponding to eight logical blocks.

In this case, taking the opportunity of occurrence of an event in which the NAND write control circuit 12 has received two cluster bitmaps corresponding to two clusters in the 8-KB large cluster from the write data control circuit 11, the NAND write control circuit 12 may issue the two NAND write commands.

When only one logical block (one sector) is to be written in the small cluster mode, it is sufficient if only one NAND write command including a cluster bitmap indicating the one logical block to be written is transmitted from the NAND write control circuit 12 to the NAND interface control circuit 20. However, when only one logical block (one sector) is to be written in the 8-KB large cluster mode, it becomes necessary to transmit not only a NAND write command including a cluster bitmap indicating the one logical block to be written, but also another NAND write command including a cluster bitmap indicating that no logical block to be written exists from the NAND write control circuit 12 to the NAND interface control circuit 20.

Regarding the cluster of the first half including new data corresponding to one logical block to be written (to be transferred) of the two clusters in the 8-KB large cluster, new data corresponding to the one logical block is merged with data (old data) corresponding to the cluster read from the NAND-type flash memory 5, whereby write data corresponding to one cluster is created, and the write data corresponding to the one cluster is written to the NAND-type flash memory 5. Then, regarding the cluster of the latter half in which no logical block to be transferred exists of the two clusters in the 8-KB large cluster, write data corresponding to one cluster is created by only data (old data) corresponding to one cluster which corresponds to the cluster and is read from the NAND-type flash memory 5, and this write data corresponding to the one cluster is written to the NAND-type flash memory 5. The address translation table 61 is updated, and the logical address corresponding to the large cluster is associated with a physical address indicating contiguous storage area of 8 KB in the NAND-type flash memory 5 to which write data (8-KB data) corresponding to two clusters has been written.

In the SSD 3 having a mode (large cluster mode) in which plural clusters (large cluster) are made a write unit of one time, when the skip write command is supported, there is sometimes a case where the entirety of one of the two clusters in the large cluster is skipped in the middle of data transfer. For example, there is a case where the entirety of the cluster of the latter half of the two clusters in the large cluster is skipped or a case where the entirety of the cluster of the first half is skipped.

When the entire of one of the two clusters in the large cluster is skipped, write data corresponding to one of the two clusters in the large cluster is not transmitted from the host and hence transmission of a cluster bitmap from the write data control circuit 11 to the NAND write control circuit 12 is executed only once.

FIG. 14 shows an example of a skip mask 100 by which data corresponding to one cluster included in plural clusters (large cluster) is skipped.

This skip mask 100 has a length (skip mask length) corresponding to N+1 logical blocks. The logical blocks can be distinguished from each other by a lower-order bit part ($LBA[\log_2(N+1)-1:0]$) of the LBA. The 8-KB large cluster includes a cluster of the $LBA[\log_2(N+1)-1:0]=0$ to 7, and a cluster of the $LBA[\log_2(N+1)-1:0]=8$ to 15. In the skip mask 100 of FIG. 14, all the eight valid bits corresponding to the $LBA[\log_2(N+1)-1:0]=8$ to 15 are "0". In this case, write data corresponding to one cluster corresponding to the $LBA[\log_2(N+1)-1:0]=8$ to 15 is skipped, and the write data corresponding to the skipped one cluster is not received from the host 2.

Accordingly, the NAND write control circuit 12 receives only a cluster bitmap (here, a cluster bitmap corresponding to the cluster of the first half in the large cluster) corresponding to one of the clusters in the 8-KB large cluster, and hence it becomes impossible for the NAND write control circuit 12 to recognize the timing at which a NAND write command should be transmitted. As a result, it becomes impossible for the NAND write control circuit 12 to correctly execute an operation of transmitting two NAND write commands per 8-KB large cluster to the NAND interface control circuit 20 as shown in FIG. 15. That is, when data corresponding to one cluster included in the plural clusters (large cluster) is skipped, the NAND command transmission timing becomes uncertain.

Further, when write data corresponding to one cluster is skipped, also a cluster bitmap corresponding to the skipped cluster is not transmitted to the NAND write control circuit 12 from the write data control circuit 11. As a result, it becomes impossible for the NAND write control circuit 12 to correctly execute an operation of transmitting two cluster bitmaps per 8-KB large cluster to the NAND interface control circuit 20.

FIG. 16 shows a NAND write command transmission operation executed by the host interface control circuit 10.

Within a period during which the SSD controller LSI 4 is in the large cluster mode, when a skip write command with a skip mask (write control information) is received from the host 2, the host interface control circuit 10 transfers write data received from the host 2 to the buffer 21 in units of clusters. The host interface control circuit 10 determines whether or not the cluster being currently transferred is the last valid cluster in the plural clusters (8-KB large cluster), which includes data to be written, by referring to the contents of the skip mask associated with each cluster subsequent to the cluster being currently transferred. When the cluster being currently transferred is the last valid cluster in the plurality of clusters (8-KB large cluster), the host interface control circuit 10 transmits a plurality of write instructions (here, two NAND write commands) corresponding to the plural clusters to the NAND interface control circuit 20. Thereby, even when the entirety of one of the two clusters in the large cluster is skipped, it is possible to correctly execute the operation of transmitting two NAND write commands per 8-KB large cluster to the NAND interface control circuit 20.

More specifically, the host interface control circuit 10 is configured as described below.

The write data control circuit 11 of the host interface control circuit 10 includes an end-of-cluster (EOC) addition circuit 11A.

The EOC addition circuit 11A determines whether or not the cluster being currently transferred is the last valid cluster in the plural clusters (large cluster), which includes data to be written, by referring to the contents of a skip mask associated with each cluster subsequent to the cluster being currently transferred. For example, when the cluster of the first half of the two clusters in the 8-KB large cluster includes one or more logical blocks to be transferred, data of the cluster of the first half is transferred to the buffer 21. In this case, the EOC addition circuit 11A refers to the contents of the skip mask corresponding to the cluster of the latter half subsequent to the cluster of the first half to thereby determine whether or not the cluster of the first half being currently transferred is the last valid cluster in the 8-KB large cluster, which includes data to be written. If data (logical block to be transferred) to be written does not exist in the cluster of the latter half, the EOC addition circuit 11A determines that the cluster of the first half is the last valid cluster in the 8-KB large cluster. Then, the EOC addition circuit 11A adds an EOC flag indicating that this cluster is the last valid cluster in the large cluster to a cluster bitmap of the cluster of the first half being currently transferred. Thereby, a cluster bitmap with the EOC flag is transmitted from the write data control circuit 11 to the NAND write control circuit 12.

The NAND write control circuit 12 includes an EOC control circuit 12A.

When the NAND write control circuit 12 receives the cluster bitmap with the EOC flag, the EOC control circuit 12A transmits a plurality of write instructions (here, two NAND write commands) corresponding to the plural clusters to the NAND interface control circuit 20 at the point of time when the transfer of the cluster being currently transferred to the buffer 21 has been completed without waiting for reception of the subsequent cluster bitmap. At this time, regarding the cluster bitmap which has not been transmitted by the write data control circuit 11 to the NAND write control circuit 12, the EOC control circuit 12A creates a cluster bitmap indicating that data (logical block to be transferred) to be written does not exist, and transmits a NAND write command including this cluster bitmap to the NAND interface control circuit 20.

It should be noted that only when the cluster being currently transferred is not a cluster immediately before a plural-clusters-boundary (large cluster boundary), the EOC addition circuit 11A may refer to the contents of the skip mask associated with each cluster subsequent to the cluster being currently transferred. The plural-clusters-boundary (large cluster boundary) exists between the last cluster of a certain plural clusters (certain large cluster) and the first cluster of the next plural clusters (next large cluster). The EOC addition circuit 11A compares the LBA of the cluster being currently transferred and the plural-clusters-boundaries (large cluster boundaries) with each other, whereby the EOC addition circuit 11A can determine whether or not the cluster being currently transferred is a cluster immediately before the plural-clusters-boundary (large cluster boundary), i.e., whether or not the cluster being currently transferred is the last cluster in the plural clusters.

When the cluster being currently transferred is a cluster immediately before the plural-clusters-boundary (large cluster boundary), i.e., when the cluster being currently transferred is the last cluster in a certain plural clusters (large cluster), the EOC addition circuit 11A may add an EOC flag to the cluster bitmap of the cluster being currently transferred without referring to the contents of the skip mask associated with each cluster subsequent to the cluster being currently transferred.

Further, instead of adding the EOC flag, an arbitrary signal making it possible to recognize that the cluster being currently transferred is the last valid cluster in the plural clusters (large cluster) may be transmitted from the write data control circuit 11 to the NAND write control circuit 12. For example, since a cluster bitmap (cluster bitmap including valid bits all of which are "0") corresponding to a cluster (cluster in which no logical block to be transferred exists) not to be transferred to the buffer 21 is not transmitted from the write data control circuit 11 to the NAND write control circuit 12, a cluster bitmap including valid bits all of which are "0" may be used in place of an EOC flag. In this case, the write data control circuit 11 may firstly transmit a cluster bitmap (without an EOC flag) corresponding to the cluster being currently transferred to the NAND write control circuit 12, and may subsequently transmit a cluster bitmap including valid bits all of which are "0" to the NAND write control circuit 12 in order to notify the NAND write control circuit 12 that the cluster being currently transferred is the last valid cluster in the plural clusters (large cluster).

FIG. 17 shows some data patterns associated with 8-KB data to be used in a mode in which two clusters (8-KB large cluster) are made a write unit of one time.

In FIG. 17, "1" indicates a cluster in which at least one logical block to be transferred exists, and "0" indicates a cluster in which no logical block to be transferred exists.

A data pattern #1 indicates a data pattern in which at least one logical block to be transferred exists in the first cluster in an 8-KB large cluster, and no logical block to be transferred exists in the second cluster (last cluster) in the 8-KB large cluster. In this case, the first cluster is the last valid cluster in the 8-KB large cluster, and hence the host interface control circuit 10 transmits two NAND write commands to the NAND interface control circuit 20 at the point of time when transfer of the first cluster to the buffer 21 has been completed.

A data pattern #2 indicates a data pattern in which no logical block to be transferred exists in the first cluster in the 8-KB large cluster, and at least one logical block to be transferred exists in the second cluster (last cluster) in the 8-KB large cluster. In this case, the second cluster is the last valid cluster in the 8-KB large cluster, and hence the host interface control circuit 10 transmits two NAND write commands to the NAND interface control circuit 20 at the point of time when transfer of the second cluster to the buffer 21 has been completed.

FIG. 18 shows some data patterns as with 16-KB data to be used in a mode in which four clusters (16-KB large cluster) are made a write unit of one time.

In FIG. 18, "1" indicates a cluster in which at least one logical block to be transferred exists, and "0" indicates a cluster in which no logical block to be transferred exists.

A data pattern #1 indicates a data pattern in which at least one logical block to be transferred exists in only each of the first cluster and the second cluster in an 16-KB large cluster, and no logical block to be transferred exists in the third cluster and the fourth cluster in the 16-KB large cluster. In this case, the second cluster is the last valid cluster in the 16-KB large cluster, and hence the host interface control circuit 10 transmits four NAND write commands to the NAND interface control circuit 20 at the point of time when transfer of the second cluster to the buffer 21 has been completed.

A data pattern #2 indicates a data pattern in which at least one logical block to be transferred exists in only each of the second cluster and the fourth cluster in the 16-KB large cluster, and no logical block to be transferred exists in the first cluster and the third cluster in the 16-KB large cluster. In this case, the fourth cluster is the last valid cluster in the 16-KB large cluster, and hence the host interface control circuit 10 transmits four NAND write commands to the NAND interface control circuit 20 at the point of time when transfer of the fourth cluster to the buffer 21 has been completed.

A data pattern #3 indicates a data pattern in which at least one logical block to be transferred exists in only each of the third cluster and the fourth cluster in the 16-KB large cluster, and no logical block to be transferred exists in the first cluster and the second cluster in the 16-KB large cluster. In this case, the fourth cluster is the last valid cluster in the 16-KB large cluster, and hence the host interface control circuit 10 transmits four NAND write commands to the NAND interface control circuit 20 at the point of time when transfer of the fourth cluster to the buffer 21 has been completed.

Figure 19:
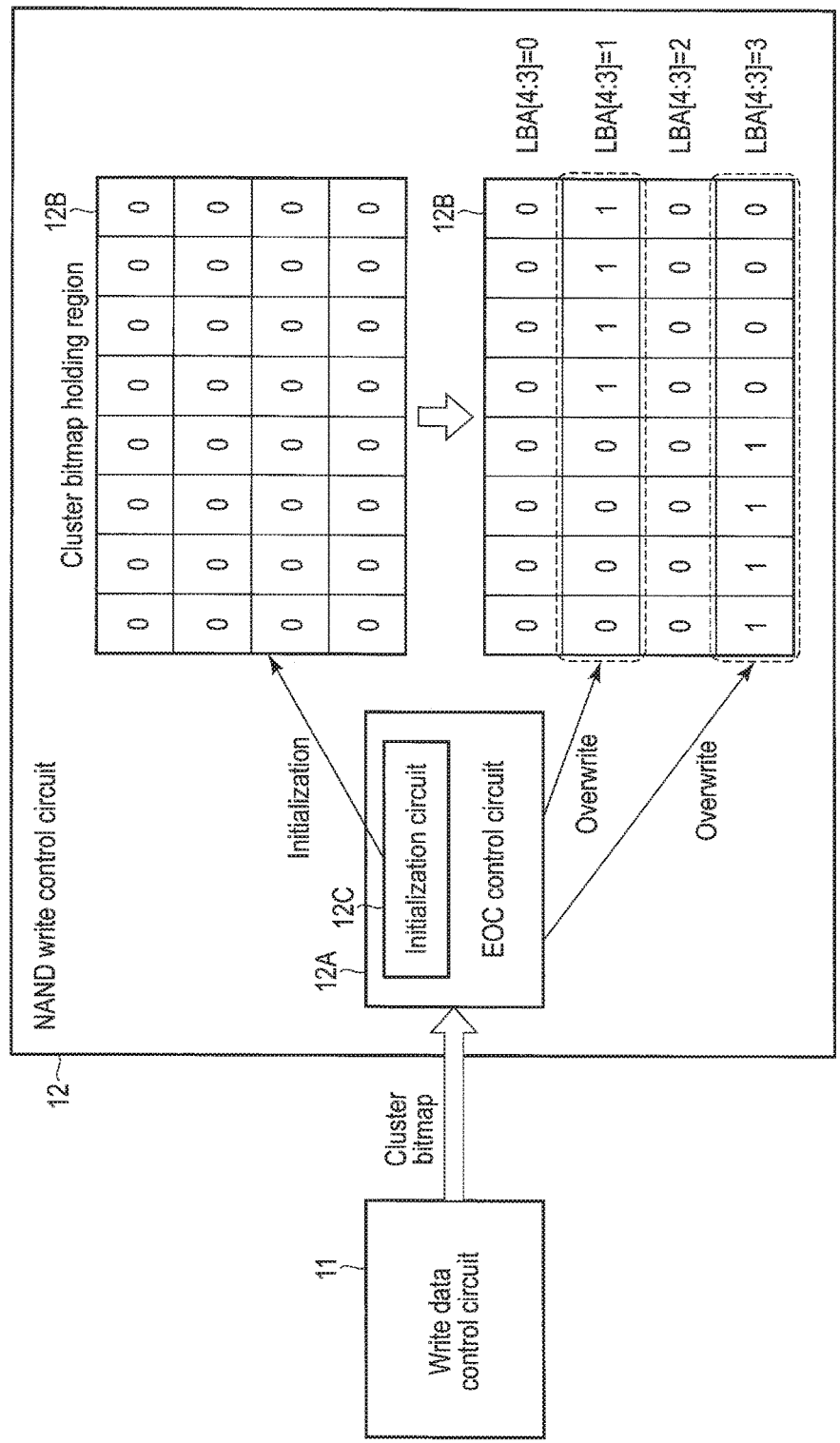
FIG. 19 is a view showing an operation of creating a cluster bitmap corresponding to clusters each having no data to be written (no logical block to be written), which is executed by the host interface control circuit in the storage device of the embodiment.

FIG. 19 shows an operation of creating a cluster bit map corresponding to clusters each having no data of any kind to be written (no logical block of any kind to be transferred).

The NAND write control circuit 12 may include a cluster bitmap holding region 12B and an initialization circuit 12C. In the following description, a case where the number of clusters included in the large cluster is four (16-KB large cluster) is assumed.

The cluster bitmap holding area 12B includes four storage regions. Each storage region has an 8-bit length.

Each time transmission of NAND write commands corresponding to the plural clusters is completed, the initialization circuit 12C initializes the cluster bitmap holding region 12B to thereby set all the contents of each storage region to "0".

In the case of the data pattern #2 of FIG. 18, the write data control circuit 11 transmits only a cluster bitmap corresponding to the second cluster and a cluster bitmap corresponding to the fourth cluster to the NAND write control circuit 12. A cluster bitmap corresponding to the first cluster and a cluster bitmap corresponding to the third cluster are not transmitted from the write data control circuit 11 to the NAND write control circuit 12.

The EOC control circuit 12A overwrites a corresponding storage region in the cluster bitmap holding region 12B with a cluster bitmap received from the write data control circuit. Since an LBA has been added to each cluster bitmap received from the write data control circuit 11, the EOC control circuit 12A can recognize what number cluster the cluster bitmap received from the write data control circuit 11 corresponds to in the 16-KB large cluster on the basis of the LBA (for example, two bits of the LBA[4:3]).

The cluster bitmap (for example, "00001111") corresponding to the second cluster in the 16-KB large cluster is written to the second storage region in the cluster bitmap holding region 12B. Thereby, the contents of the second storage region in the cluster bitmap holding region 12B are changed from "00000000" to "00001111". The cluster bitmap (for example, "11110000") corresponding to the fourth cluster in the 16-KB large cluster is written to the fourth storage region in the cluster bitmap holding region 12B. Thereby, the contents of the fourth storage region in the cluster bitmap holding region 12B are changed from "00000000" to "11110000".

The cluster bitmap corresponding to the first cluster and the cluster bitmap corresponding to the third cluster are not transmitted from the write data control circuit 11 to the NAND write control circuit 12, and hence the contents of the first storage region and the third storage region in the cluster bitmap holding region 12B are maintained at "00000000".

Thereby, it is possible to create a cluster bitmap ("00000000") corresponding to a cluster in which no logical block to be transferred exists. The NAND write control circuit 12 can transmit four NAND write commands and four cluster bitmaps to the NAND interface control circuit 20, based on the contents of the cluster bitmap holding region 12B.

A flowchart of FIG. 20 shows a procedure for a skip write operation executed by the SSD 3 in a mode in which the plural clusters (large cluster) is made a write unit of one time.

The write data control circuit 11 of the host interface control circuit 10 starts an operation of transferring write data received from the host 2 to the buffer 21 in the NAND interface control circuit 20 in units of clusters (step S101).

The EOC addition circuit 11A of the write data control circuit 11 determines whether or not the cluster being currently transferred is a cluster immediately before a plural-clusters-boundary (large cluster boundary), i.e., whether or not the cluster being currently transferred is the last cluster in the plural clusters (step S102).

When the cluster being currently transferred is not a cluster immediately before the plural-clusters-boundary, i.e., when the cluster being currently transferred is not the last cluster in the plural clusters (NO in step S102), the EOC addition circuit 11A determines whether or not the cluster being currently transferred is the last valid cluster in the plural clusters, which includes data to be written, by referring to the contents of a skip mask associated with each cluster subsequent to the cluster being currently transferred (step S103).

When the cluster being currently transferred is not the last valid cluster in the plural clusters (NO in step S103), the write data control circuit 11 transmits a cluster bitmap to which no EOC flag is added to the NAND wright control circuit 12 of the host interface control circuit 10 (step S104). This cluster bitmap corresponds to the cluster being currently transferred, and indicates logical blocks to be transferred.

On the other hand, when the cluster being currently transferred is a cluster immediately before the plural-clusters-boundary, i.e., when the cluster being currently transferred is the last cluster in the plural clusters (YES in step S102), the EOC addition circuit 11A adds an EOC flag to a cluster bitmap corresponding to the cluster being currently transferred, and the write data control circuit 11 transmits the cluster bitmap with the EOC flag to the NAND write control circuit 12 (step S105).

Further, when the cluster being currently transferred is not a cluster immediately before the plural-clusters-boundary (NO in step S102), but is the last valid cluster in the plural clusters (YES in step S103), the EOC addition circuit 11A adds an EOC flag to a cluster bitmap corresponding to the cluster being currently transferred, and the write data control circuit 11 transmits the cluster bitmap with the EOC flag to the NAND write control circuit 12 (step S105).

When the NAND write control circuit 12 receives the cluster bitmap with the EOC flag, the EOC control circuit 12A of the NAND write control circuit 12 creates a cluster bitmap indicating that no logical block to be transferred exists with respect to the cluster for which the write data control circuit 11 has not transmitted a cluster bitmap because of occurrence of skips in units of clusters (step S106).

When the NAND write control circuit 12 receives a notification indicating that transfer of the current cluster to the buffer 21 has been completed from the write data control circuit 11 (YES in step S107), the EOC control circuit 12A of the NAND write control circuit 12 transmits a plurality of write instructions (a plurality of NAND write commands) each of which includes a cluster bitmap to the NAND interface control circuit 20 (step S108).

The NAND controller 23 of the NAND interface control circuit 20 writes data to the NAND-type flash memory 5 for each cluster on the basis of each of the write instructions (step S109).

FIG. 21 shows a hardware configuration example of an information processing apparatus functioning as the host 2.

This information processing apparatus is realized as a server computer or a personal computer. This information processing apparatus includes a processor (CPU) 101, main memory 102, BIOS-ROM 103, network controller 105, peripheral interface controller 106, controller 107, embedded controller (EC) 108, and the like.

The processor 101 is a CPU configured to control an operation of each component of this information processing apparatus. This processor 101 executes various programs to be loaded from any one of a plurality of SSDs 3 into the main memory 102. The main memory 102 is constituted of a random access memory such as a DRAM. The programs to be executed by the processor 101 include, for example, an application software layer 41, OS 42, file system 43, and the like.

Further, the processor 101 also executes the Basic Input/Output System (BIOS) stored in the BIOS-ROM 103 which is a nonvolatile memory. The BIOS is a system program for hardware control.

The network controller 105 is a communication device such as a wired LAN controller and wireless LAN controller. The peripheral interface controller 106 is configured to execute communication with a peripheral device such as a USB device.

The controller 107 is configured to execute communication with devices each connected to a plurality of connectors 107A. In this embodiment, a plurality of SSDs 3 are each connected to a plurality of connectors 107A. The controller 107 is a SAS expander, PCIe Switch, PCIe expander, flash array controller, RAID controller or the like.

The EC 108 functions as a system controller configured to execute power management of an information processing apparatus.

FIG. 22 shows a configuration example of an information processing apparatus including a plurality of SSDs 3 and a host 2.

This information processing apparatus is provided with a thin box-like rack-mountable housing 201. A number of SSDs 3 may be arranged inside the housing 201. In this case, each of the SSDs 3 may be detachably inserted in each of slots provided in the front surface 201A of the housing 201.

A system board (motherboard) 202 is arranged inside the housing 201. On the system board (motherboard) 202, various electronic components including a CPU 101, memory 102, network controller 105, and controller 107 are mounted. These electronic components function as a host 2.

As described above, according to this embodiment, it is possible to cope with a large cluster such as that of 8 KB/16 KB while maintaining the basic configuration in which write of data to the NAND-type flash memory 5 is controlled in units of 4-KB clusters. Furthermore, even when the entirety of any one of a plurality of clusters in a large cluster is skipped, it is possible to correctly execute an operation of transmitting a plurality of NAND write commands corresponding to a plurality of clusters to the NAND interface control circuit 20.

It should be noted that in this embodiment, a NAND memory has been exemplified as a nonvolatile memory. However, the function of this embodiment can be applied to other various nonvolatile memories such as a magnetoresistive random access memory (MRAM), phase change random access memory (PRAM), resistive random access memory (ReRAM) or ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
a buffer;
a nonvolatile memory; and
a controller electrically connected to the nonvolatile memory,
the controller configured to manage mapping between logical addresses and physical addresses of the nonvolatile memory in at least one of a first mode and a second mode, in the first mode, the controller being configured to manage mapping between the logical addresses and the physical addresses of the nonvolatile memory in units of first management sizes corresponding to a cluster including a plurality of logical blocks, and a in the second mode, the controller being configured to manage mapping between the logical addresses and the physical addresses of the nonvolatile memory in units of second management sizes corresponding to a plurality of clusters such that the number of the physical addresses of the nonvolatile memory to be managed is reduced, and
the controller including a host interface control circuit configured to transfer write data received from a host to the buffer, and a memory interface control circuit configured to write data corresponding to one cluster to the nonvolatile memory by using the write data in the buffer on the basis of a write instruction from the host interface control circuit, the host interface control circuit including a write data control circuit configured to transfer write data received from the host to the buffer, and a write control circuit configured to transmit the write instruction to the memory interface control circuit, wherein
the host interface control circuit is configured to,
when, during the second mode, a skip write command with a skip mask indicating logical blocks to be transferred is received from the host,
transfer write data received from the host to the buffer in units of clusters,
determine whether or not a cluster being currently transferred is a last valid cluster in the plurality of clusters, which includes data to be written, by referring to the skip mask associated with each cluster subsequent to the cluster being currently transferred, and
transmit, when the cluster being currently transferred is the last valid cluster in the plurality of clusters, a plurality of write instructions corresponding to the plurality of clusters, and a plurality of bitmaps corresponding to the plurality of clusters, the plurality of bitmaps each indicating logical blocks to be transferred, to the memory interface control circuit, wherein,
when a first cluster of the plurality of clusters includes no data owing to occurrence of skips in units of clusters, a first bitmap of the plurality of bitmaps corresponding to the first cluster indicates that no logical block to be transferred exists,
the write data control circuit is configured to
determine whether or not the cluster being currently transferred is the last valid cluster in the plurality of clusters, which includes data to be written, by referring to the skip mask associated with each cluster subsequent to the cluster being currently transferred, and
transmit, when the cluster being currently transferred is the last valid cluster in the plurality of clusters, a bitmap indicating logical blocks to be transferred and a flag indicating that the cluster being currently transferred is the last valid cluster, to the write control circuit, wherein
upon receipt of the flag from the write data control circuit, the write control circuit creates a bitmap indicating that no logical block to be transferred exists with respect to the cluster for which the write data control circuit has not transmitted a bitmap owing to occurrence of skips in units of clusters.

2. The storage device of claim 1, wherein
the host interface control circuit is configured to
determine whether or not the cluster being currently transferred is a last cluster in the plurality of clusters, and
transmit, when the cluster being currently transferred is the last cluster in the plurality of clusters, the plurality of write instructions and the plurality of bitmaps to the memory interface control circuit.

3. The storage device of claim 1, wherein
the write control circuit is configured to
transmit, when the flag is received from the write data control circuit, the plurality of write instructions and the plurality of bitmaps to the memory interface control circuit.

* * * * *